(12) United States Patent
Abma et al.

(10) Patent No.: US 11,105,946 B2
(45) Date of Patent: Aug. 31, 2021

(54) SEPARATION OF MULTIPLE SEISMIC SOURCES OF DIFFERENT TYPES BY INVERSION

(71) Applicant: BP Corporation North America Inc., Houston, TX (US)

(72) Inventors: Raymond Lee Abma, Houston, TX (US); Joseph Anthony Dellinger, Houston, TX (US); Kang Fu, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 140 days.

(21) Appl. No.: 16/597,642

(22) Filed: Oct. 9, 2019

(65) Prior Publication Data

US 2020/0116885 A1 Apr. 16, 2020

Related U.S. Application Data

(60) Provisional application No. 62/745,068, filed on Oct. 12, 2018.

(51) Int. Cl.
*G01V 1/36* (2006.01)
*G01V 1/30* (2006.01)

(52) U.S. Cl.
CPC .............. *G01V 1/368* (2013.01); *G01V 1/308* (2013.01)

(58) Field of Classification Search
CPC .................. G01V 1/368; G01V 1/308; G01V 2210/1423; G01V 2210/1425; G01V 2210/1293; G01V 2210/1295; G01V 1/003; G01V 1/3808; G01V 1/364
See application file for complete search history.

(56) References Cited

U.S. PATENT DOCUMENTS

| | | |
|---|---|---|
| 8,295,124 B2 | 10/2012 | Abma |
| 8,837,255 B2 | 9/2014 | Ross et al. |
| 9,081,107 B2 | 7/2015 | Abma et al. |

(Continued)

FOREIGN PATENT DOCUMENTS

| | | | |
|---|---|---|---|
| EP | 2592439 A | 5/2013 | |
| WO | 2010/019957 A1 | 2/2010 | |
| WO | WO-2020076702 A1 * | 4/2020 | ............. G01V 1/364 |

OTHER PUBLICATIONS

International Search Report and Written Opinion dated Dec. 16, 2019, for PCT/US2019/055001, filed on Oct. 1, 2019.

(Continued)

*Primary Examiner* — Daniel Pihulic
(74) *Attorney, Agent, or Firm* — Conley Rose, P.C.

(57) ABSTRACT

A method of seismic exploration above a region of the subsurface containing structural or stratigraphic features conducive to the presence, migration, or accumulation of hydrocarbons comprises accessing at least a portion of a blended seismic source survey, separating the at least two interfering seismic source excitations using inversion separation, producing one or more source gathers based on the separating, and using the one or more source gathers to explore for hydrocarbons within said region of the subsurface. The blended source seismic survey contains at least two interfering seismic source excitations therein, and the seismic source excitations can be produced by seismic source types having different signatures or frequency characteristics.

20 Claims, 15 Drawing Sheets

(56) References Cited

U.S. PATENT DOCUMENTS

| | | |
|---|---|---|
| 9,310,498 B2 | 4/2016 | Howe |
| 2010/0039894 A1* | 2/2010 | Abma .................... G01V 1/362 |
| | | 367/52 |
| 2012/0033525 A1 | 2/2012 | Abma et al. |
| 2012/0147701 A1 | 6/2012 | Ross et al. |
| 2015/0260867 A1 | 9/2015 | Abma et al. |
| 2020/0116885 A1* | 4/2020 | Abma .................... G01V 1/364 |

OTHER PUBLICATIONS

Dellinger et al. Wolfspar, an—FWI-friendly—ultra-low-frequency marine seismic source.

Robertsson, Johan O.A. et al., "Wavefield Signal Apparition, Part 1: Theory," 78th EAGE Conference & Exhibition, Vienna, Austria, May 30-Jun. 2, 2016 (5 p.).

Robertsson, Johan O.A. et al., "Wavefiled Signal Apparition: Simultaneous Source Separation," SEG International Exposition and 86th Annual Meeting, 2016, pp. 5648-5654 (7 p.).

* cited by examiner

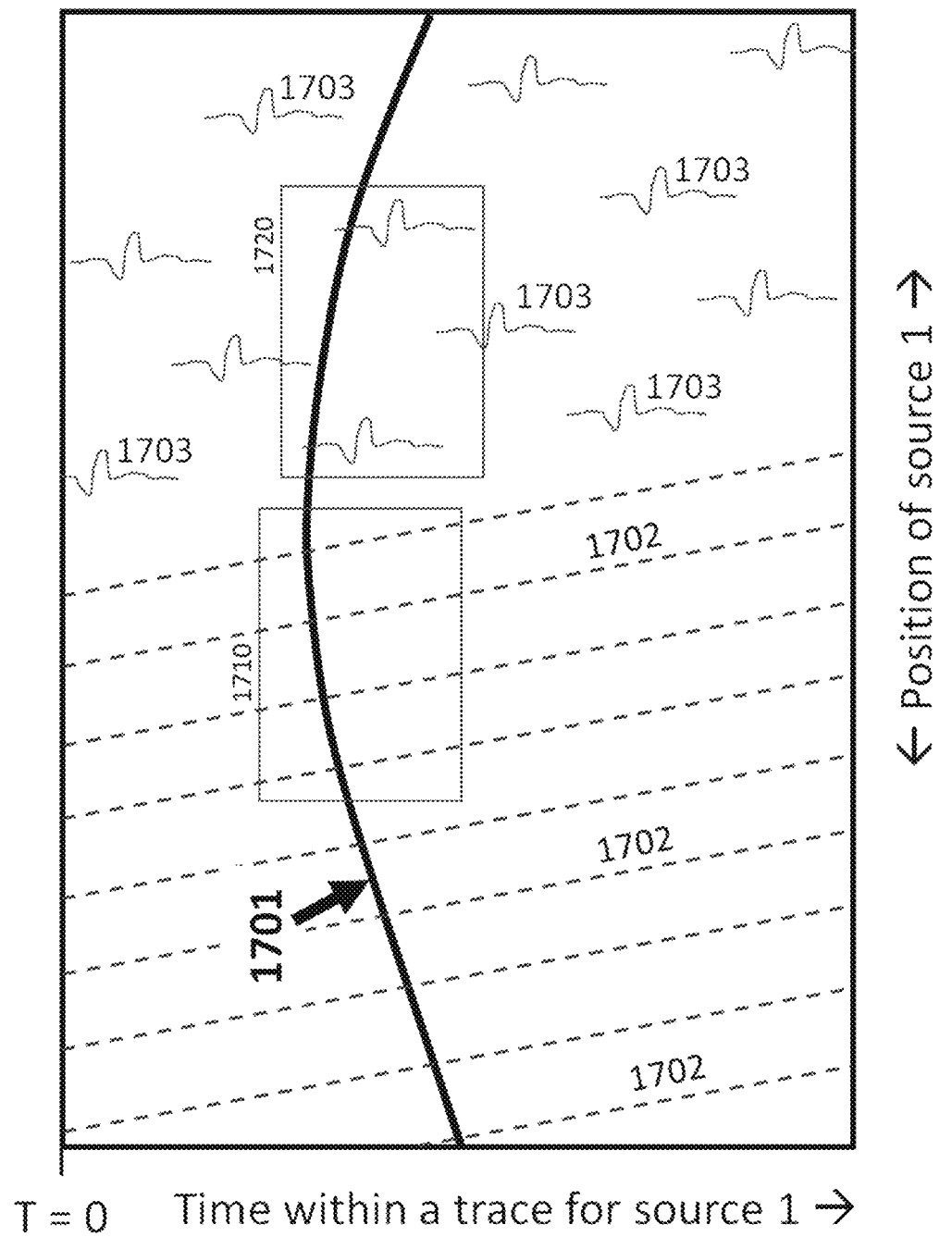

SEPARATION OF MULTIPLE SEISMIC SOURCES OF DIFFERENT TYPES BY INVERSION

CROSS-REFERENCE TO RELATED APPLICATIONS

This application claims benefit of U.S. provisional application Ser. No. 62/745,068 filed Oct. 12, 2018, and entitled "Separation of Multiple Seismic Sources of Different Types by Inversion," which is hereby incorporated herein by reference in its entirety for all purposes.

STATEMENT REGARDING FEDERALLY SPONSORED RESEARCH OR DEVELOPMENT

Not applicable.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, interacts with geological structures in the Earth, and, upon its return, is recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey.

SUMMARY

In an embodiment, a method of seismic exploration above a region of the subsurface containing structural or stratigraphic features conducive to the presence, migration, or accumulation of hydrocarbons comprises accessing at least a portion of a blended seismic source survey, separating the at least two interfering seismic source excitations using inversion separation, producing a plurality of separate source gathers based on the separating, and using the plurality of source gathers to explore for hydrocarbons within said region of the subsurface. The blended source seismic survey contains at least two interfering seismic source excitations therein, and the seismic source excitations are produced by at least two seismic sources having different signatures or frequency characteristics.

In an embodiment, a method of seismic exploration comprises initiating a plurality of seismic source excitations above a region of the subsurface containing structural or stratigraphic features conducive to the presence, migration, or accumulation of hydrocarbons, and producing a blended seismic source survey comprising data obtained from reflections generated by the plurality of seismic source excitations. The plurality of seismic source excitations are produced by at least two seismic sources having different signatures or frequency characteristics, and the blended source seismic survey contains at least two interfering seismic source excitations therein. The at least two interfering seismic source excitations are separated using inversion separation, and a plurality of source gathers are produced based on the separation of the at least two interfering seismic source excitations.

In an embodiment, a method of seismic exploration above a region of the subsurface containing structural or stratigraphic features conducive to the presence, migration, or accumulation of hydrocarbons comprises accessing at least a portion of a blended seismic source survey, separating the at least two interfering seismic source excitations using inversion separation, producing a plurality of separate source gathers based on the separating, and using the plurality of source gathers to explore for hydrocarbons within said region of the subsurface. The blended source seismic survey contains at least two interfering seismic source excitations therein, and the seismic source excitations are produced by at least a first seismic source and a second seismic source having different signatures or frequency characteristics. At least one of the first seismic source or the second seismic source is a low-frequency source, and at least one of the plurality of separate source gathers contains low-frequency data, or data at other frequencies lacking in conventional seismic sources.

In an embodiment, a method of seismic exploration above a region of the subsurface containing structural or stratigraphic features conducive to the presence, migration, or accumulation of hydrocarbons comprises accessing at least a portion of a blended seismic source survey, and using a plurality of generated source gathers to explore for hydrocarbons within said region of the subsurface. The blended source seismic survey contains at least two interfering seismic source excitations therein, and the seismic source excitations are produced by at least two seismic sources having different signatures or frequency characteristics.

While multiple embodiments are disclosed, still other embodiments will become apparent to those skilled in the art from the following detailed description. As will be apparent, certain embodiments, as disclosed herein, are capable of modifications in various aspects without departing from the spirit and scope of the claims as presented herein. Accordingly, the detailed description herein below is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

FIG. 15 shows a diagram of a common-receiver gather with three interfering seismic sources, each source operating on a different uniformly periodic operating schedule.

DETAILED DESCRIPTION

Figure 1:
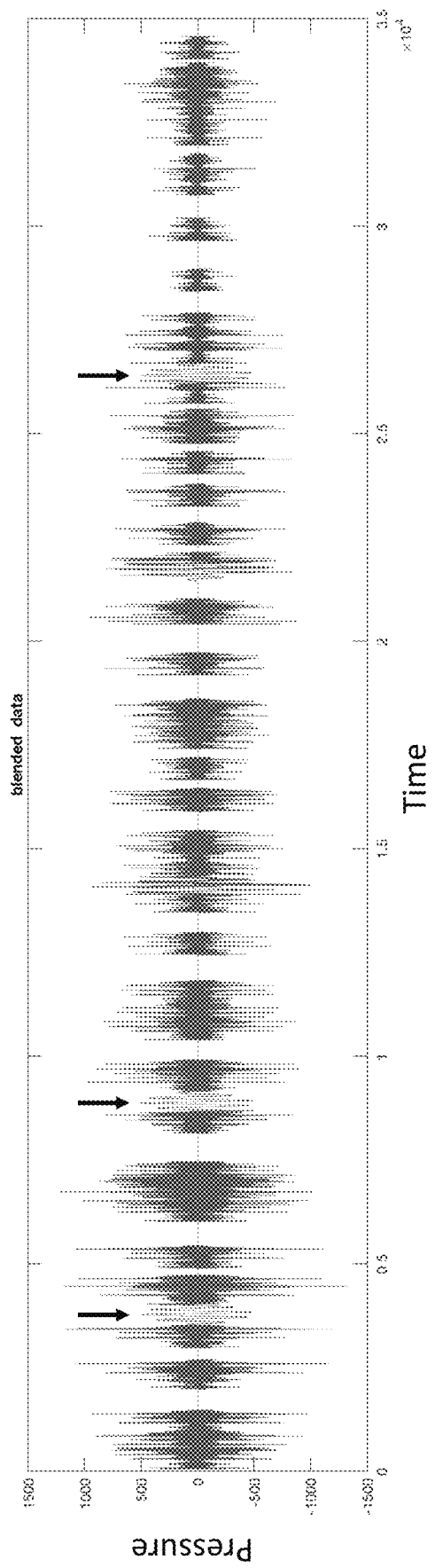
FIG. 1 illustrates a continuous trace for a single receiver spanning multiple source points from a plurality of sources.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ." The various characteristics mentioned above, as well as other features and characteristics described in more detail below, will be readily apparent to those skilled in the art with the aid of this disclosure upon reading the following detailed description of the embodiments, and by referring to the accompanying drawings.

A seismic survey is composed of a very large number of individual seismic recordings or traces. In a typical 2-D survey, there will usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing. General background information pertaining to 3-D data acquisition and processing may be found in Chapter 6, pages 384-427, of Yilmaz.

Traditionally, a seismic trace is a digital recording of the acoustic energy reflecting from inhomogeneities or discontinuities in the subsurface, where a partial reflection can occur each time there is a change in the elastic properties of the subsurface materials ("primary reflections"). Increasingly other types of returning acoustic energy are also being used in geophysics. In addition to primary reflections, acoustic energy may, for example, convert from one wave mode to another, refract along layer boundaries, diffract off scatterers, or be turned back upwards by velocity heterogeneities ("diving waves"). Waves may interact with subsurface structures multiple times within the Earth before returning to the surface to be recorded. Depending on the geophysical application, certain waves are considered "signal", and certain waves can be considered "noise."

The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (e.g., "mapping").

The data in a 3-D survey are amenable to viewing in a number of different ways. First, horizontal "constant time slices" may be extracted from a stacked or unstacked seismic volume by collecting all of the digital samples that occur at the same travel time. This operation results in a horizontal 24) plane of seismic data By animating a series of 2-D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume. It should also be noted that a 3-D dataset can be thought of as being made up of a 5-0 data set that has been reduced in dimensionality by stacking it into a 3-D image. The dimensions are typically time (or depth "z"), "x" (e.g., North-South), "y" (e.g., East-West), source-receiver offset in the x direction, and source-receiver offset in the y direction. While the examples here may focus on the 2-D and 3-D cases, the extension of the process to four, five, or more dimensions is straightforward.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of other attributes can often be empirically correlated with known hydrocarbon occurrences and that correlation applied to seismic data collected over new exploration targets.

Of course, one well-known problem with seismic data is that it is relatively expensive to acquire. Indeed, in some cases the cost of the survey may determine whether or not the economics of the proposed target are favorable. Thus, techniques that tend to reduce the cost of such surveys are useful. Closely spaced firing of two or more sources can be one strategy for reducing the cost of seismic data acquisition. The idea behind this approach is that a receiver line or patch will be deployed and that one or more sources will be activated during a single recording period. Thus, subsurface reflections from one source excitation may be comingled with those that have been sourced later, i.e., a "blended source" survey is acquired. Note that this is in stark contrast to conventional surveying techniques, wherein the returning subsurface waves from one source would not be allowed to overlap the returning waves from another.

The blending may happen because a single source is activated again before the stream of returning waves from the Earth caused by a source activation has had time to decay away (so-called "self-simultaneous" acquisition). It may also happen because multiple sources are activated in the same time window, and at some offset ranges and times their returning wave streams overlap. Both methods may be employed at the same time in the same acquisition.

Seismic acquisition with two or more sources of the same type is possible in the field for both land and marine acquisition. For example, two air-gun boats operating simultaneously can be used as a mode of marine acquisition. In some methods, the two boats generally move in a synchronized fashion, and generally also shoot in a carefully choreographed and coordinated fashion ("Distance Separated Simultaneous Source" or "Apparition" methods). In other methods, the sources move independently, and operate independently (conventional "ISS" methods). However, the methods in use to date assume that the sources to be separated are of the same type, and after separation, the returning signals from all the sources are combined into a common dataspace where the distinction as to which source produced a given bit of seismic energy in the data does not matter for subsequent processing. The returning signals are conventionally reflections, but increasingly, other types of returning signals are also used, for example diving waves, refractions, diffractions, multiply-scattered reflections, etc.

Different types of sources have different advantages, and the industry is moving towards heterogeneous source acquisition to gain the benefits of having different types of sources in a single survey. To save time and expense, the sources may operate simultaneously. For example, a marine survey can use air-guns to cover 2-80 Hz, sparkers to cover 70-120 Hz, and a low-frequency vibrator to cover 1.5-3 Hz, and all of these different sources could operate simultaneously and be recorded into the same receivers.

Certain embodiments can attempt to combine all of these recorded sources into a single broadband dataset, simulating a survey with a single source that has the combined advantages of all the different types of sources. The sources cannot be treated as "identical", however, and the sources are generally matched to each other first so that they fit into a combined dataset. In other cases, the types of sources may be sufficiently different, or used for sufficiently distinct purposes, such that a clear distinction should be maintained between them, so the resulting datasets can be processed separately. Certain embodiments can also do both at the same time, combining some of the overlapping sources while leaving others distinct. For example, certain embodiments can combine air-gun and sparker data into a common 2-120 Hz dataset used both for velocity-model building and imaging, but leave the low-frequency 1.5-3 Hz vibrator data separate to be used just for the initial stages of velocity-model building. In areas of complex geology, velocity-model building can be a prerequisite to successful imaging; the imaging algorithms require a good velocity model of the Earth to produce a good result. The same data may also be combined differently, depending on the application.

It also often happens that if two or more seismic acquisitions (which are intended to be separate) are operated near enough to each other in time and space, then sources from one survey are also recorded in another. This "seismic interference" is conventionally treated as unwanted noise. However, using the methods described herein, the "interference" may instead be deblended and removed, or deblended and separated out as a distinct ultra-long-offset dataset, or even treated as welcome additional signal and included as another source in the survey.

In view of the above, one or more embodiments are directed to a system and method for separating multiple seismic sources, where the seismic sources can have different source signatures, and where the multiple seismic sources have been activated during a single seismic recording. In contrast to the previous approaches, one or more embodiments of the present systems and methods allow a user to separate sources, where the returning seismic waves of the separate sources were acquired overlapped in time. As such, one or more embodiments can obtain two or more separated source data sets that can each have different source information. The use of more than one set of sources will allow seismic surveys to be acquired faster if the recorded seismic energy resulting from the different sources can be separated. This method may be especially effective with acquisition of wide-azimuth reflection surveys, because the kinematics of the reflectors will be significantly different for different shots, which allows the continuity of the reflections to be used in several dimensions. Further, the ability to obtain different source data sets allows different types of information to be obtained from the survey.

In brief, the systems and methods of one or more embodiments utilize an inversion-type method to separate information that is captured by a seismic recording into multiple source data sets. The seismic recording is a recording of reflections that originate from multiple seismic sources (e.g., Vibroseis®, air guns, low frequency sources, etc.). The seismic recording, which can record overlapping reflectors, can be separated into multiple, source data sets. In some embodiments, the sources will be initiated (e.g., fired) at random times while multiple receivers are recording. Each instance of firing can be referred to as a shot. The random or pseudo-random delays between the random firings tend to make the interference between different sources incoherent while the reflections associated with the same source create coherent events. In some embodiments, one or more of the sources may be continuous or semi-continuous while the other sources are initiated at random times. The separation can be achieved with a numerical inversion process that utilizes the signatures for each source, the start times of each shot of each source, and the coherence of reflection events between nearby shots. A signature for a source can correspond to a distinct aspect of the source (e.g., the sweep performed for each shot, frequency characteristics, etc.). This method has the potential to allow seismic surveys to be acquired faster and cheaper, with better signal quality and bandwidth, than has been heretofore possible.

Mathematically, in some embodiments, the recorded data can be represented as $d=\Gamma m$, where d is a representation of the continuous recorded data containing overlapping signals, m is a representation of the data traces that would have been recorded in a conventional one-source-at-a-time seismic experiment where the data for each source activation is in a separate trace, and $\Gamma$ is a blending operator that sums together the traces in m using the known source activation times to create the continuous blended data. The systems and methods of one or more embodiments describe how to use the blended recorded data d to accurately estimate the desired unblended data m, which can then be used for further processing just as if the data had been recorded in separate, unblended surveys. In the case of a continuously sounding source, the source activation times can be specified on a convenient regular repeating interval, and $\Gamma$ can contain appropriate tapering such that the consecutive "source points" sum back together to reconstitute the continuous source signal.

As represented in a computer system, d will typically be represented as an array with dimensions of time sample and receiver number. In some embodiments, the time axis may be subdivided into records of fixed length. For example, continuous time may be subdivided into traces one minute long, splitting the time axis into two dimensions, "minute" and "time sample within the minute", m will typically be an array with dimensions of time, source activation number, type of source, and receiver number. $\Gamma$ will have dimensions of time (possibly subdivided into two dimensions), source type, source number, and receiver number. $\Gamma$ will typically be very large but very sparsely populated, and, as such, $\Gamma$ will typically be represented in software applications on a computer by a function call. It will typically not be stored as a large static matrix. Instead, its elements can be calculated as needed from a table of source initiation times.

Ire some embodiments, m can represent "a complete survey", with a trace for every possible combination of type of source, source position, and receiver. Source-receiver combinations that did not actually occur in the survey (and thus are not represented in the recorded data d) will correspond to zeroes in $\Gamma$. In this embodiment, m can contain traces interpolated by the deblending process to fill in the acquisition gaps. Interpolation could also be used to replace recorded traces for which the shot and/or receiver were so deficient in their performance that the corresponding trace is best treated as "missing", or to replace traces contaminated by a transient noise burst. In other embodiments, m can contain traces only for the source-receiver combinations that were actually acquired in the survey. Intermediate cases are also possible, with m representing a "complete survey" for some source types, but only the source-receiver combinations that were actually acquired for other source types. In any case, the problem can be considered as being underdetermined, with more entries in m to solve for than there are unique elements in d. Some assumptions may need to be made to solve this problem. The solution is to observe that the recorded data should vary smoothly as a function of source and receiver position for a given source, and to use this to constrain the estimated unblended data m, also called the "model data". For this to work, the data need to be acquired in such a way to ensure that arrivals from different sources are not coherent with each other, typically by introducing time dithering into the source initiation times. The time dithering information is contained in the blending operator $\Gamma$. To enforce smoothness, one or more embodiments can add an additional constraint m$\approx$S m, where S is a matrix or operator that describes coherency criteria that are appropriate for each source. The coherency criterion will then ensure that data from the correct sources will separate out properly in m. The solution is then to solve the coupled pair of equations d=$\Gamma$m and m$\approx$S m. One or more embodiments could also apply a weighting term W and solve the pair of equations W d$\approx$W$\Gamma$m and m$\approx$S m, where the weighting term W is a matrix, or more generally, an operator. This would allow one or more embodiments to weight the importance of some receivers over others, to balance the amplitudes of different types of sources, or to weight different time or frequency windows differently. Conventionally, these equations could be solved in a least squares algorithm (e.g., an L2 algorithm) or a fast minimization algorithm (e.g., an L1 algorithm) using one of the many available algorithms available for this purpose. The disclosed systems and methods provide an alternative iterative solution method that has been shown to produce superior results. In certain scenarios, there are two or more overlapping simultaneous sources of the same type, and the goal is to create an unblended dataset equivalent to a traditional survey where the same set of sources are fired sequentially and do not overlap. With regard to S, S can be any operator that constrains the events in nearby shots to be similar or coherent. S is not limited to applications in a single direction but may be applied to the full dimensionality of the acquired data (e.g., 2-D, 3-D, 4-D, etc.), or any suitable lower-dimensional subset of the data. Further, it should not be assumed from the previous equation that S is necessarily a linear operator. Although in some embodiments, S can be a linear operator, in other instances this variable will represent a non-linear operator, or a linearized version of the same.

In some embodiments, S represents a fast Fourier transform ("FFT"). For irregularly spaced shots, S can better be calculated with discrete Fourier transforms or some other method that allows for the irregular sampling of the shots. In some embodiments, S can include a 3-dimensional Fourier transform and a thresholding operation to remove weak events, which tend to be noise, and pass the strong events, which tend to be coherent signals. This allows S to improve the coherency of recorded seismic signals.

The method can extract time windows from the data d that correspond to source activations followed by a listening time interval. This extraction of time windows can be referred to as "combing the data d." If there is no overlap of data from separate source activations, then combing the data would directly produce m. This scenario corresponds to conventional single-source seismic processing. Mathematically, $m_{comb}=\Gamma^\tau$ d, where the combing operator $\Gamma^\tau$ is the transpose of the blending operator $\Gamma$. Where the sources do overlap, then the traces in the combed data $m_{comb}$ can be considered to be contaminated with crosstalk from the other source(s). However, because of the time dithering of the source activations, this crosstalk noise will generally be incoherent. The noise can therefore be attenuated by applying S which removes non-smooth incoherent energy, to create an improved estimate of the unblended data $m_{smooth}$. Mathematically, $m_{smooth}=S\ m_{comb}=S\ \Gamma^\tau$ d. The algorithm then calculates the blended seismic data corresponding to this $m_{smooth}$, which is an approximated estimate of the recorded data d.

The estimated data can be calculated as $d_{estimated}=\Gamma\ m_{smooth}$. If the difference between the actual data "d" and "$d_{estimated}$" is sufficiently small, then the process has successfully determined a coherent deblended dataset $m_{smooth}$ that is consistent with the recorded field data d, and the process is finished. Otherwise, the method can then calculate the data misfit $d_{residual}=d-d_{estimated}$, and use it to improve $m_{smooth}$. This improvement is done by performing the following steps First, the method can update the estimated deblended dataset: $m_{updated}=m_{smooth}+\Gamma^\tau\ d_{residual}$. Then the method can apply the coherency constraint to that updated estimate, to calculate a new $m_{smooth}$: S $m_{updated} \rightarrow m_{smooth}$. Finally, the method can then return to the start of this paragraph and repeat these steps until the data residual is sufficiently small. The determination of what is considered sufficiently small can be selected as criteria for the solution and/or can be selected based on an acceptable reduction or minimization in the data residual, and as a result can vary from analysis to analysis. In some embodiments, the data residual can be zero, while in other embodiments, data residual can be considered sufficiently small when the values are less than a noise level in the data.

In practice, at each iteration of the cycle above, the method can save $m_{smooth}$ from the previous iteration ($m_{save}$) and the proposed updated version ($m_{proposed}$), and then calculate a weighted average of these two to use as the new update: $m_{smooth}=(1-\lambda) m_{save}+\lambda m_{proposed}$. The weighting factor $\lambda$ should be positive, but no larger than one over the maximum blending factor, e.g., the maximum number of overlapping sources present in the data being processed Every trace in m corresponds to a particular source-receiver pair, so the method can easily implement a weighting term by making $\lambda$ a function of source, receiver, offset, time, etc. More generally the weighted average could also be applied in a transformed domain, so $\lambda$ could also be a function of frequency, etc. For example, $m_{smooth}=FT^{-1}[(1-\lambda)FT(m_{save})+\lambda FT(m_{proposed})]$, where FT and $FT^{-1}$ indicate Fourier transformation and inverse Fourier transformation, respectively. Weights could be applied in more than one domain, if desired.

The method can include having source excitations that occur within the same recording separated in time by random or pseudo-random time intervals. If recorded shots are randomly spaced, each recorded shot may be less likely to record coherent energy from other shots that occurred close in time to the recorded shot, thus allowing the shots to be more readily separable. By exciting the shots at random times, when these shots are corrected to their individual zero times they will have signals that are coherent from source point to source point, while the interfering shots will tend to be incoherent and may be separated by the inversion process taught herein. This strengthens the operation of the coherency measures in the instant separation process.

Preferably, the acquisition itself will also be designed to accentuate the incoherency between different sources. For example, when shooting conventional marine seismic on position, each source fires when it reaches the next desired shot position. The desired shot positions are generally evenly spaced. For a vessel moving at a constant speed, the shots will thus also occur with a regular time increment. As previously described, for a blended survey, a dither is added to that time to ensure that each source not be coherent with the others. However, one or more embodiments can further ensure that, even without dithering, the different sources would still not be coherent by designing the survey such that no two vessels ever move "in formation", i.e. with one boat moving with a constant vector offset from another. One simple way to ensure this is by assigning different speeds to different vessels, so that even if two vessels happen to move in the same direction on parallel survey lines, their corresponding shots would not fall in the same pattern. The different vessel speeds translate into different shot intervals, so that the shots would not be coherent even in the absence of dithering.

The above description described how to apply the method to sources of a single type, where the different sources are combined into a single unblended data volume m. With the advent of new types of seismic sources, such as, for example, Wolfspar®, a low-frequency vibratory source, there is now a need for systems and methods that can process data recorded using simultaneous acquisition of sources of more than one type. Such systems and methods can process data recorded using simultaneous acquisition of sources of more than one type by implementing the following: (1) generalizing the above algorithm to the case of multiple inputs and outputs, (2) modifying the algorithm to balance different types of data so one source type does not dominate over others in the inversion, (3) accounting for source signatures that may differ dramatically in temporal extent, frequency content, etc, and may vary from source point to source point, and/or (4) sources that may be coherent in different domains.

The new system and method of one or more embodiments can be illustrated by working through a simple example: simultaneous acquisition of a plurality of different types of sources (such as, for example, two air-gun sources and one low-frequency source). The two air-gun sources are of the same type and together form a single unified survey. The low-frequency source is of a different type with a different acquisition plan and forms a separate survey. In this example, the method still records a single combined dataset d as before, but now this method is directed to determining two different ms, one for the air-gun survey, and one for the low-frequency source survey.

Mathematically, the method now has $d=\Gamma_A m_A+\Gamma_W m_W$, where $\Gamma_A$ is the blending matrix appropriate for the air-gun model data $m_A$, and $\Gamma_W$ is the blending matrix appropriate for the low-frequency source model data $m_W$. The goal is to find $m_A$ and $m_W$ that produce the recorded data d and also satisfy $m_A \approx S_A m_A$ and $m_W \approx S_W m_W$, where $S_A$ and $S_W$ are appropriate smoothness constraints appropriate for the corresponding source types and acquisition geometries.

Figure 2:
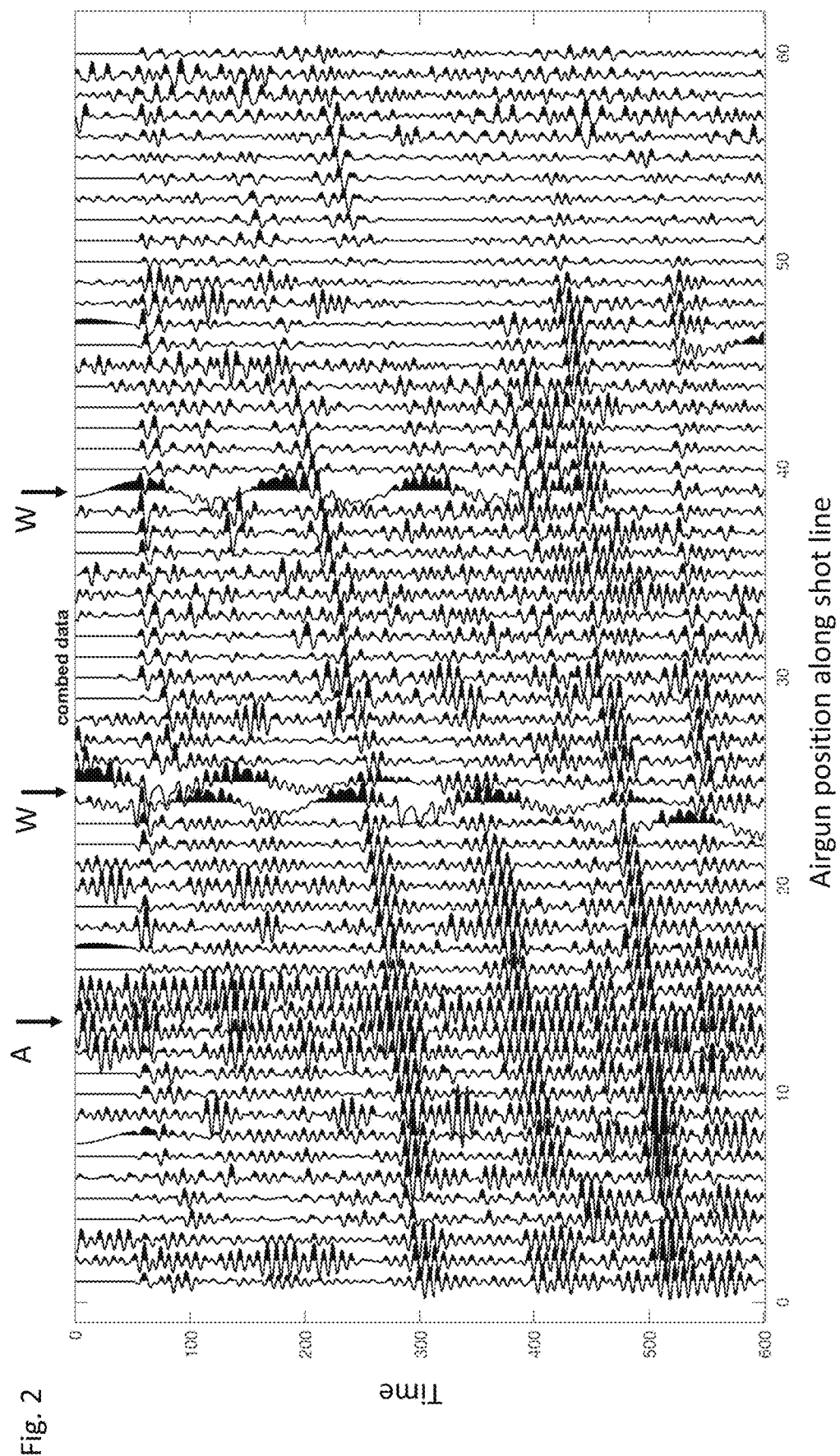
FIG. 2 illustrates combed data for a first source.
Figure 3:
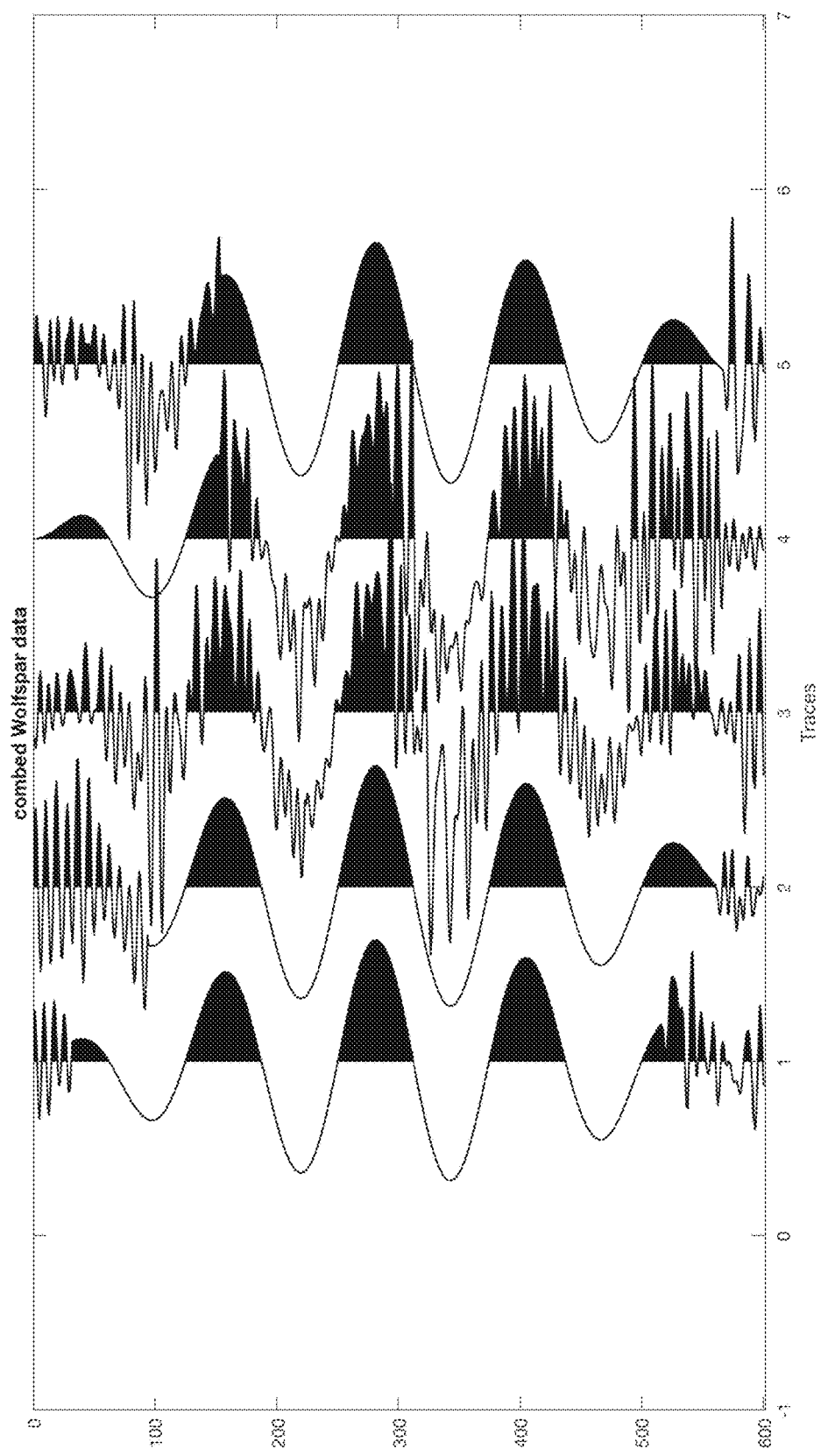
FIG. 3 illustrates combed data for a second source.

As before, the method combs the data. FIG. 1 shows a continuous trace for a single receiver spanning multiple source points from both air guns and the low-frequency vibratory source. The arrows point out where the low-frequency vibratory source can be clearly seen peeking through between the higher-amplitude air-gun arrivals. The method then combs the data for the air guns, calculating $m_{combA}=\Gamma^t_A d$ (producing the result in FIG. 2), and for the low-frequency source, calculating $m_{combW}=\Gamma^t_W d$ (producing the result in FIG. 3). The arrows in FIG. 2 point out particularly severe interference from other sources, with "A" pointing out interference from an airgun source, and "W" pointing out interference from a low-frequency vibratory source. The high-frequency "noise" visible in FIG. 3 is interference from an airgun source. One or more embodiments can then apply the smoothness constraints that are appropriate to each: $m_{smoothA}=S_A m_{combA}=S_A \Gamma^t_A d$ (producing the result in FIG. 4) and $m_{smoothW}=S_W m_{combW}=S_W \Gamma^t_W d$ (producing the result in FIG. 5).

The estimated data can be calculated as $d_{estimated}=\Gamma_A m_{smoothA}+\Gamma_W m_{smoothW}$. If the difference between the actual data "d" and "$d_{estimated}$" is sufficiently small, then the method has successfully found coherent deblended datasets $m_{smoothA}$ and $m_{smoothW}$ that are consistent with the recorded field data d, and the method completes. Otherwise, the method calculates the data misfit $d_{residual}=d-d_{estimated}$, and uses it to improve $m_{SmoothA}$ and $m_{smoothW}$. This is done by performing the following steps. First, the method updates the estimated deblended datasets: $m_{updatedA}=m_{smoothA}+\Gamma^t_A d_{residual}$ and $m_{updatedW}=m_{smoothW}+\Gamma^t_W d_{residual}$. Then the method applies the coherency constraints to the updated estimates, to calculate a new $m_{smoothA}$ and $m_{smoothW}$: $S_A m_{updatedA} \rightarrow m_{SmoothA}$ and $S_W m_{updatedW} \rightarrow m_{smoothW}$. Finally, the method can repeat these steps until the data residual is sufficiently small and the method s completed. The method can be applied to more than two types of sources. As an alternative to getting the estimate as $d_{estimated} = \Gamma_A m_{smoothA} + \Gamma_W m_{smoothW}$, the estimate of the data may be updated with $\Gamma_A m_{smoothA}$ and $\Gamma_W m_{smoothW}$ on alternative iterations, which will separate possible crosstalk between $\Gamma_A m_{smoothA}$ and $\Gamma_W m_{smoothW}$. This may also be extended to more source types.

Figure 6:
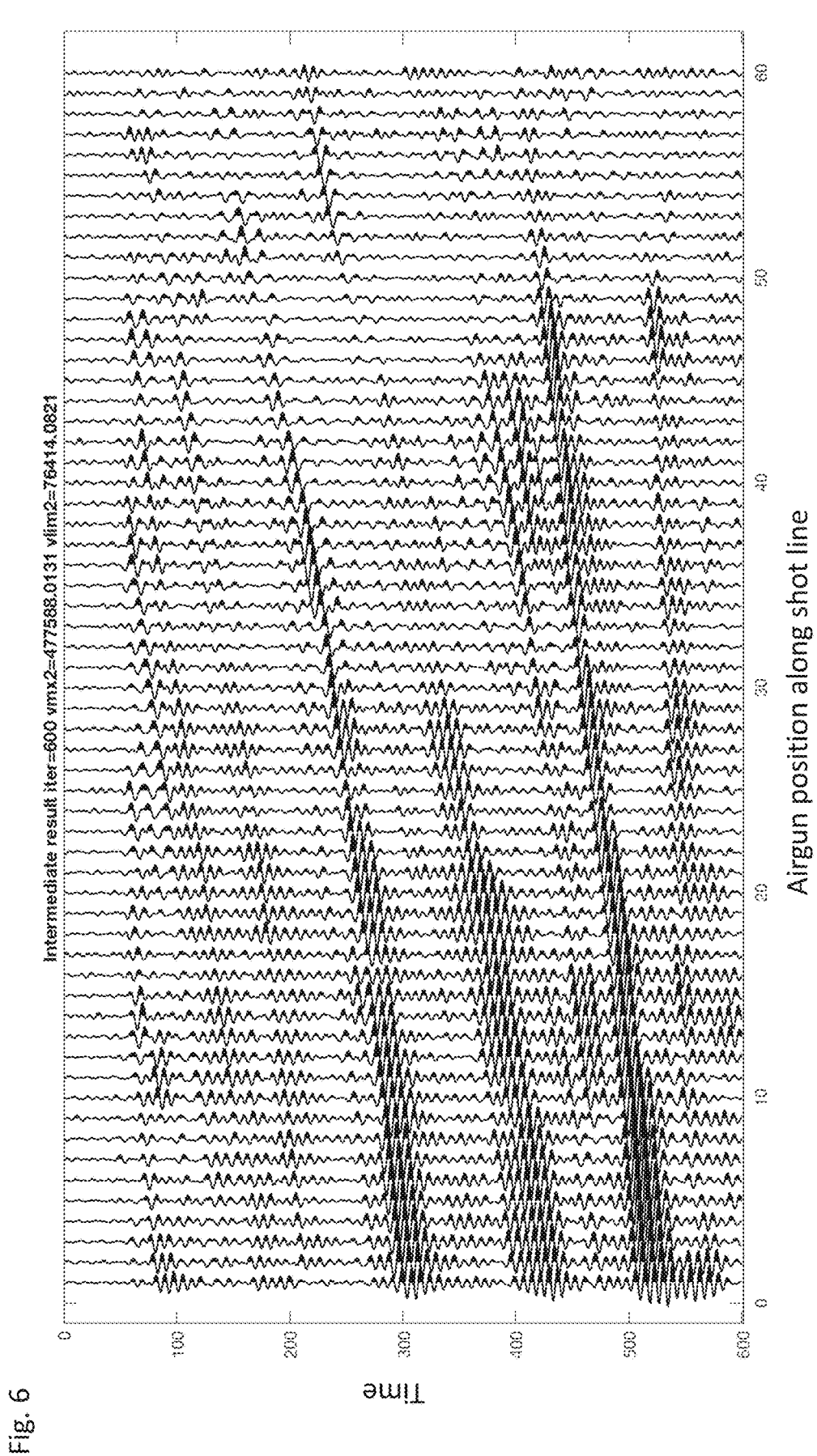
FIG. 6 illustrates the partially deblended data for the first source.
Figure 7:
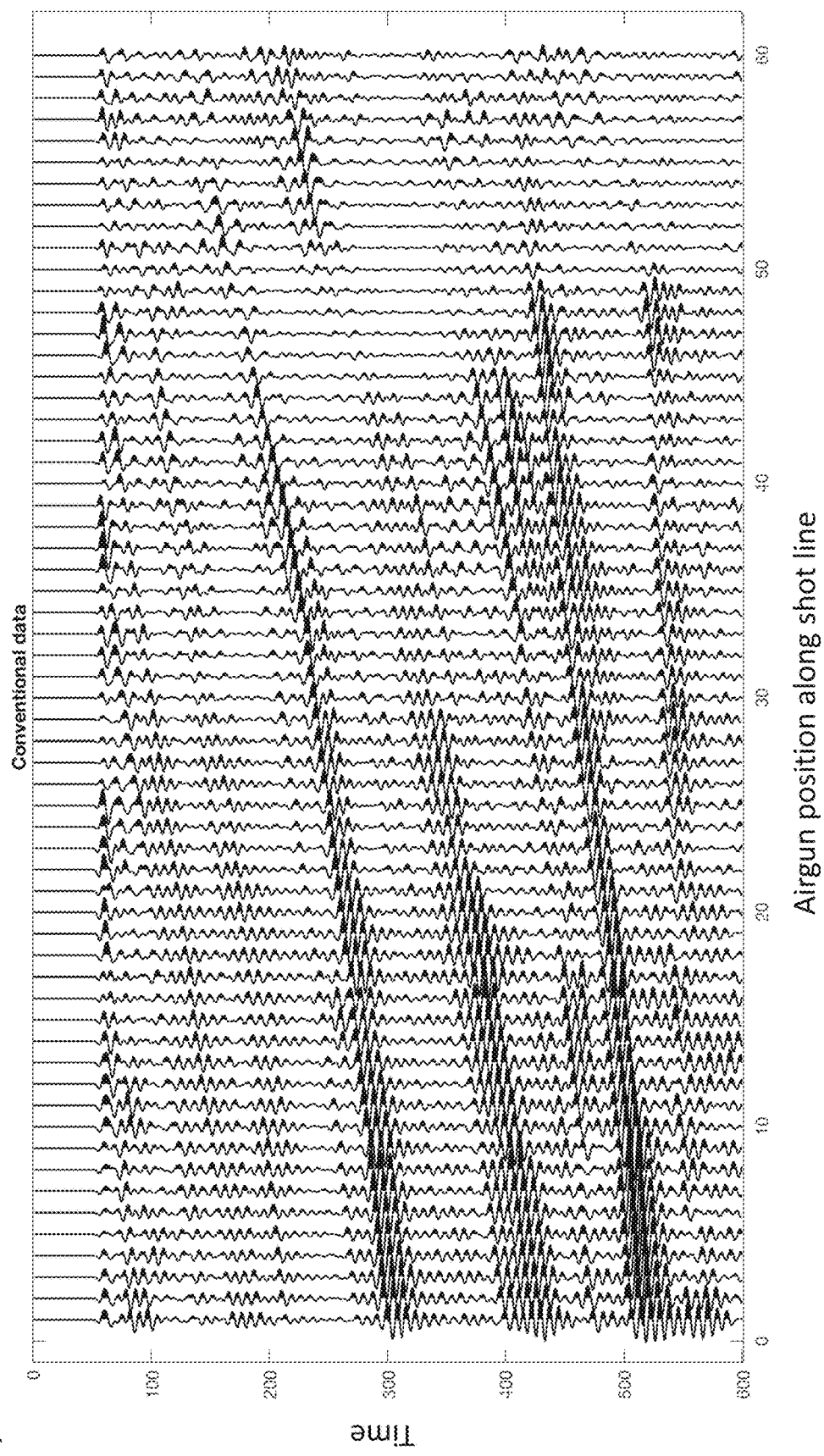
FIG. 7 illustrates the conventional result for the first source for a simulation where no interference from the second source occurred.

FIG. 6 shows the resulting deblended air-gun data after several hundred iterations. After sufficient iterations it closely approximates the exact deblended result shown in FIG. 7.

As in the single data type case, at each iteration of the cycle above, the method saves $m_{smooth}$ from the previous iteration and the proposed updated version, and then calculates a weighted average of these two to use as the new update: $m_{smoothA} = (1-\lambda_A) m_{saveA} + \lambda_A m_{proposedA}$, and $m_{smoothW} = (1-\lambda_W) m_{saveW} + \lambda_W m_{proposedW}$. Different weighting factors can be used as necessary to balance the different source types, and as before A could also be used to weight by source, source type, receiver, offset, time, etc. For example, if the air-gun signals are at much higher amplitudes than the low-frequency source signals, the method can start out the inversion with a larger $\lambda_A$ than $\lambda_W$, until the air-gun signals converge, then increase $\lambda_W$.

In practice, air guns can perform at much higher amplitudes than the low-frequency source(s) above about 5 Hz, but the low-frequency source(s) can perform at much higher amplitudes than the air guns below about 2.5 Hz. So in some embodiments, weighting would be applied in the frequency domain, with the initial iterations of the inversion weighted to emphasize updates of the strongest signals in each frequency band, then, once the stronger signals stabilize, one or more embodiments allow the weaker signals to update in the later iterations.

Air guns are generally assumed to have a consistent and repeatable source signature, and much effort has gone into making this so, but this may not be true for all types of sources. The low-frequency source, in particular, may not produce an identical signal each time it is activated. However, it continuously records how much water is being displaced and its source signature is therefore known in detail for each source activation. If the measured source signature is V, then the method can calculate a stabilized source signature deconvolution operator using any of the standard techniques. For example, the method can use a traditional formula used in the Frequency domain to calculate a stable approximate inverse. $V^{-1} = V^*/(V V^* + \epsilon^2)$, with the value of e chosen as necessary to stabilize the inversion, if the source signature is varying from source activation to source activation, then the method will need to correct for this variation before the method can apply the coherency constraint. So, instead of $S_W m_{updatedW} \rightarrow m_{smoothW}$, the method would do $V S_W V^{-1} m_{updatedW} \rightarrow m_{smoothW}$. Because the inverse $V^{-1}$ is an approximation to the true inverse, there will be errors in the result of the application of the inversion. Nevertheless, the errors will tend to be random and will be suppressed by the iterative nature of the solution.

For some choices of S and/or V, it may prove advantageous to smooth and/or signature match only the change in m at each iteration, where the change can be referred to as $m_{diff}$. If the method needs to correct for the low-frequency source signature but not the air-gun source signature, for example, than the update step in the algorithm becomes $m_{diffA} = \Gamma^t_A d_{residual}$ and $m_{diffW} = \Gamma^t_W d_{residual}$, followed by $m_{smoothA} + S_A m_{diffA} \rightarrow m_{smoothA}$ and $m_{smoothW} + V S_W V^{-1} m_{diffW} \rightarrow m_{smoothW}$. Depending on the choice of smoothing operator S and signature or matching operator V, this alternative form of the algorithm can produce a somewhat better result in particular, if the data residual is zero, the algorithm does not make any further update, regardless of S and V.

Although the above example illustrates two different types of sources, other embodiments can be directed to simultaneous acquisition of more than two types of sources (such as an "n" number of source types) Mathematically, the method now has $d = \Gamma_1 m_1 + \Gamma_2 m_2 + \ldots + \Gamma_n m_n$, where $\Gamma_1$ is the blending matrix appropriate for the first source type data $m_1$, and $\Gamma_n$ is the blending matrix appropriate for the $n^{th}$ source data type $m_n$. The goal is to find $m_1, m_2, \ldots$ and $m_n$ that produce the recorded data d and also satisfy $m_1 \approx S_1 m_1$, $m_2 \approx S_2 m_2$, and $m_n \approx S_n m_n$, where $S_1$, $S_2$, and $S_n$ are appropriate smoothness constraints appropriate for the corresponding source types and acquisition geometries. Some embodiments can also choose to treat certain types of noise as another "source", and solve for it. For example, if the noise is due to surface waves which propagate with a slower phase velocity than any seismic arrivals of interest, and the surface waves were adequately sampled by the receiver grid (which they will be below a sufficiently low frequency), then certain embodiments can find a transformed domain in which the surface-wave data become sparse. With that information, certain embodiments can then design a smoothness constraint $S_{noise}$ that operates in that domain and exploits that sparseness to accentuate the surface-wave noise and attenuate the desired seismic signals. If the noise is shot generated, one or more embodiments can know the shot times. If the noise is continuous and ambient, then certain embodiments could use uniformly spaced tapered overlapping acquisition-time windows for the corresponding "shot times" in the blending/deblending matrices.

For a controllable source such as a land or marine vibrator, one or more embodiments can deliberately introduce variation from one source activation to another during acquisition, and that can also be a way to make different sources incoherent, allowing them to be separated. One or more embodiments can use a variety of different land vibrator sweep profiles for this purpose. The existing Wolfspar® low-frequency source does not currently allow this level of flexibility, but it can alter the sign or phase of its source signatures. One preferred embodiment can use altering of the sign/phase, instead of time dithering (or to augment time dithering) to break up unwanted coherence between sources.

One or more embodiments could also use V not to remove the source signature, but instead to match the varying source activations to a "standard" signature. If M is the measured (or estimated) source signatures, and D is the desired source signatures, then one or more embodiments could use for example $V = M D^*/(D D^* + \epsilon_1^2)$ and $V^{-1} = V_0^*/(V_0 V_0^* + \epsilon_2^2)$, with $V_0$ calculated from M and D exactly as V, but possibly with a different $\epsilon_1$, for example $\epsilon_1 = 0$. Alternatively, one or more embodiments could use $V^{-1} = D M^*/(M M^* + \epsilon_2^2)$. These formulas would generally be applied in the frequency domain. Applying $V^{-1}$ converts the actual source signature (M) into the desired source signature (D), which will introduce noise if the desired signature contains frequencies that are not present in the source signature, or only present at a level not sufficiently above the noise. The stabilization parameter $\epsilon_2$ limits how much amplification will be applied, and stabilizes the result. V converts the desired source signature (D) back to the actual one (M), which generally will be a more stable operation. Typically one or more embodiments would thus choose to have more stabilization for the inverse operator than the forward operator, i.e. one or more embodiments would typically have $\epsilon_2 > \epsilon_1 \geq 0$.

Note, in the case of marine acquisition, one or more embodiments could choose to have the desired source signature D not include the effects of the source ghost, but include the source ghost in M, and thus use the signature matching to de-ghost the data. For this to work well, one or more embodiments should ensure during acquisition that there is variety in the ghost notches, i.e. the source depth is varying between shots. Alternatively, one or more embodiments can ensure that the elements in the source array are not all at the same depth.

There might be reason to do signature mapping even for sources of a single type. Decades of work have gone into making air-gun source signatures consistent and predictable within their main frequency band, i.e. about 5-40 Hz. Outside this frequency band, less work has been done, and air-gun arrays have proven to be much more variable in their source signatures at these extended frequencies. So it might make sense to treat the port and starboard air-gun arrays from a single boat acquisition as "two separate sources", for example. The resulting two datasets could then be matched to each other to quantify the differences in the source signatures between what ideally should have been identical sources. Or, the same air-gun array at different times might be considered as "several separate sources", to capture and correct for undesired secular variation of a single source.

One or more embodiments could also separate one source or source type into two or more by frequency. To continue the previous example, one or more embodiments might use bandpass filtering to split the data into two frequency ranges, below and above 5 Hz for example (with some overlap between), such that $d=d_{low}+d_{high}$. One or more embodiments could then solve for $d_{low}$ and $d_{high}$ as two separate problems. For example, if two air-gun arrays are believed to behave identically at higher frequencies but may differ below 5 Hz, then one or more embodiments could solve for the two different air-gun arrays separately for $d_{low}$ but as a single source type for $d_{high}$.

By measuring the varying airgun source signature in the field, for example from hydrophone(s) placed near the airgun array, one or more embodiments may also incorporate that knowledge into the process and use the measured signatures M to correct the varying airgun source signatures to a desired constant signature D, just as one or more embodiments would do for a vibratory source with a varying but measured signature.

Mile it may be preferable to match different source types to the same source signature before extracting coherent energy, such matching can create issues where the signal to noise ratio (S/N) is poor for one of the source types. For example, a low-frequency source such as Wolfspar® can be designed to supplement air guns at low frequencies, and to produce minimal signal at higher frequencies. Thus, above about 4 Hz, air guns dominate over the low-frequency source, whereas, below 2 Hz, the low-frequency source dominates over air guns. Matching the low-frequency source with air guns could create significant noise in the low-frequency source signal above 4 Hz, and in the air guns below 2 Hz. The combined problem is poorly constrained because the two different source types generally significantly overlap over a narrow frequency range of about 2-4 Hz. So one or more embodiments can solve the problem over these two different frequency ranges separately. In particular, one embodiment can initially treat the low-frequency source above 5 Hz as "noise" and not include it in the higher-frequency-band inversion. Once the two air-gun sources were deblended, then the low-frequency source could be introduced, and $\lambda_A$ set to be very small so that the air-gun sources are only allowed to make very small updates. For the lower frequency band, the reverse strategy could be employed, first solving for the low-frequency source and then adding in the air guns later. Finally, one embodiment can end by doing a full-bandwidth inversion. To generalize the concept to all types of seismic sources, some embodiments can define the effective frequency bands which have acceptable S/N ratio for every source, and apply a very small weight to the other frequency bands to avoid cross-contamination between different sources.

Some embodiments can have a range of source types, each optimized to cover a different frequency band, such that the different source types can be combined together to simulate a single ultra-broadband source. One or more embodiments can then design a desired ultra-broadband source signature, and partition that signature among the optimal frequency ranges of the different source types. So, for example, if D is the desired broadband source signature, and if three source types are spanning the full frequency band, one or more embodiments could divide the source signature into overlapping frequency windows such that $D=D_{low}+D_{mid}+D_{high}$, with the frequency bands chosen to cover the optimal S/N frequency bands of each type of source. The selection of frequency windows may vary from analysis to analysis as the selection can depend on the frequency content of the seismic sources. For example, a low frequency source can result in a low frequency range of around 0 to 2.5 Hz, a mid-frequency range to be around 2.5 to 5 Hz, and a high frequency range to be about 5 Hz to the Nyquist frequency. Depending on the particular model and seismic sources used, other frequency ranges can be defined and used for the source signature ranges. One or more embodiments could then match each source type to the appropriate bandpass-filtered source signature using a matching operator V, as previously described. After solving the problem for $d=\Gamma_{low} m_{low}+\Gamma_{mid} m_{mid}+\Gamma_{high} m_{high}$, one or more embodiments could then simulate the desired ultra-broadband dataset as $d_{broadband}=V^{-1}_{low} m_{low}+V^{-1}_{mid} m_{mid}+V^{-1}_{high} m_{high}$.

For implementation convenience, one or more embodiments can, for example, use the "desired data" $m'=V^{-1} m$ as the variable being updated during each iteration, so $d_{broadband}=m'_{low}+m'_{mid}+m'_{high}$. This requires adjusting the rest of the formulas to compensate for the change in variables from m to m' in a straightforward way. Those of ordinary skill in the art will recognize that there are other possible variations in the algorithm that change the computation but leave the underlying mathematics the same.

To be able to add the different deblended datasets together into a combined ultra-broadband dataset, all the different types of sources need to be represented on the same grid. In practice, the different source types would typically have different acquisitions. In particular the lower frequencies might be more coarsely sampled, so that many source points might be "missing" for the lower-frequency sources. One or more embodiments can fill in these missing source points during the deblending process, by using the blending operator $\Gamma$ to multiply these missing traces by zero. An appropriate choice of smoothness constraint will then have the effect of interpolating in the missing source points, so all the frequency bands could be represented onto a common grid producing a combined dataset that simulates a single broadband source.

Clearly the correct choice of smoothness constraint S is important to solving the problem. In general, any noise removal algorithm that works on a type of gather that is sufficiently well sampled in the data could be used. One approach is to transform the data into a domain where the desired signal becomes sparse, and the noise non-sparse. All the data below some percentile threshold can then be set to zero, and the data can then be transformed back into the original domain. Typically, the data can be subdivided into tapered overlapping subsets, each subset can be smoothed, and the smoothed subsets can then be recombined. This methodology is a technique for noise removal. Typically the transform of choice is local 2-D, 3-D, 4-D, or even 5-D Fourier transformation, which represents the data as a sum of events with linear moveout: lines, planes, hyper-planes, etc. Other transforms such as the Radon transform can also be used. The Radon transform represents the data as a sum of hyperbolas, so if the desired signal is expected to look like hyperbolas, this domain could produce a better result. Other applications use various types of wavelets, and other transform domains have been more recently proposed such as "curvelets", "seislets", etc.

Figure 4:
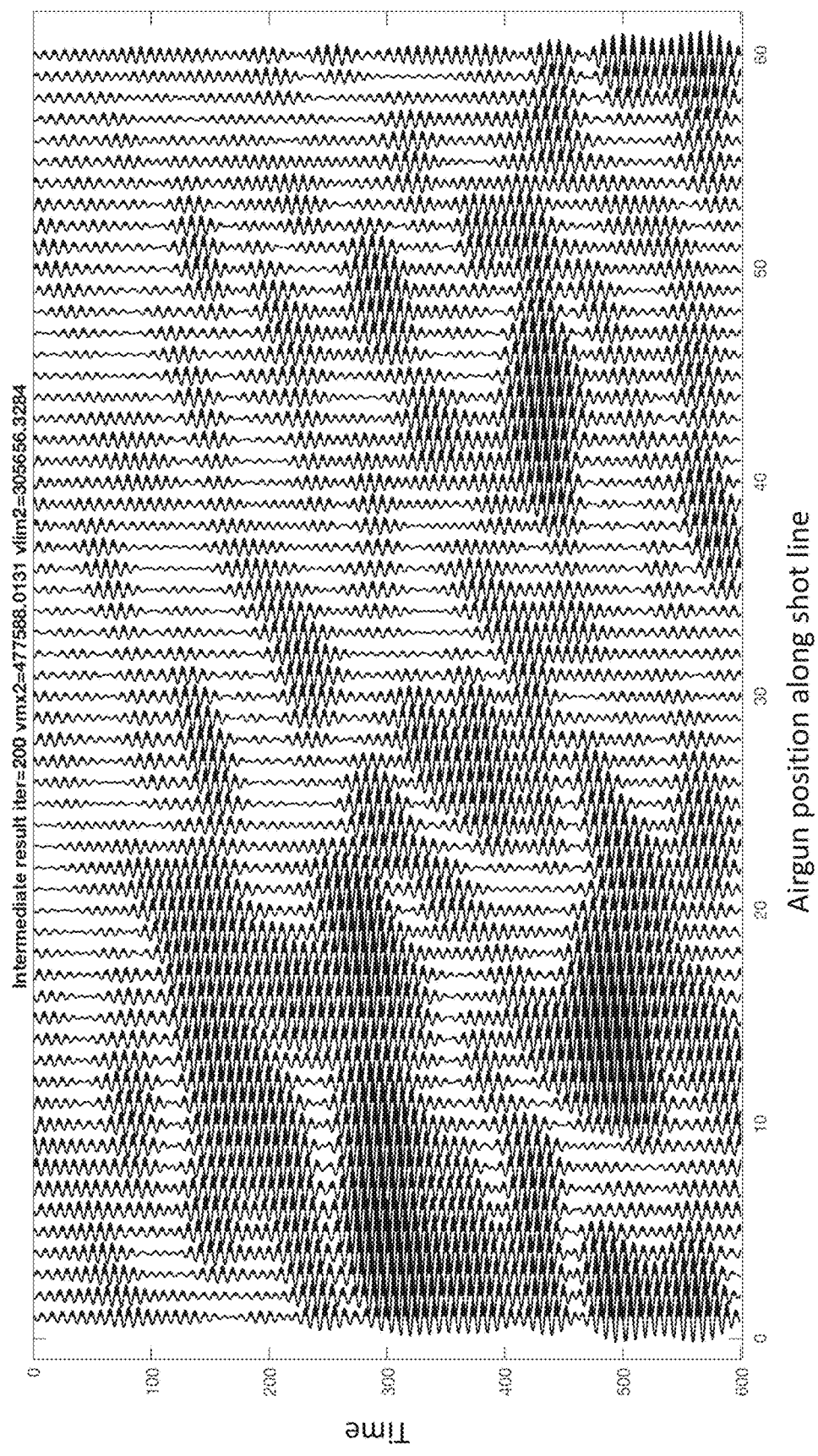
FIG. 4 illustrates data from one of the earner iterations for the first source after a smoothness constraint is applied.
Figure 5:
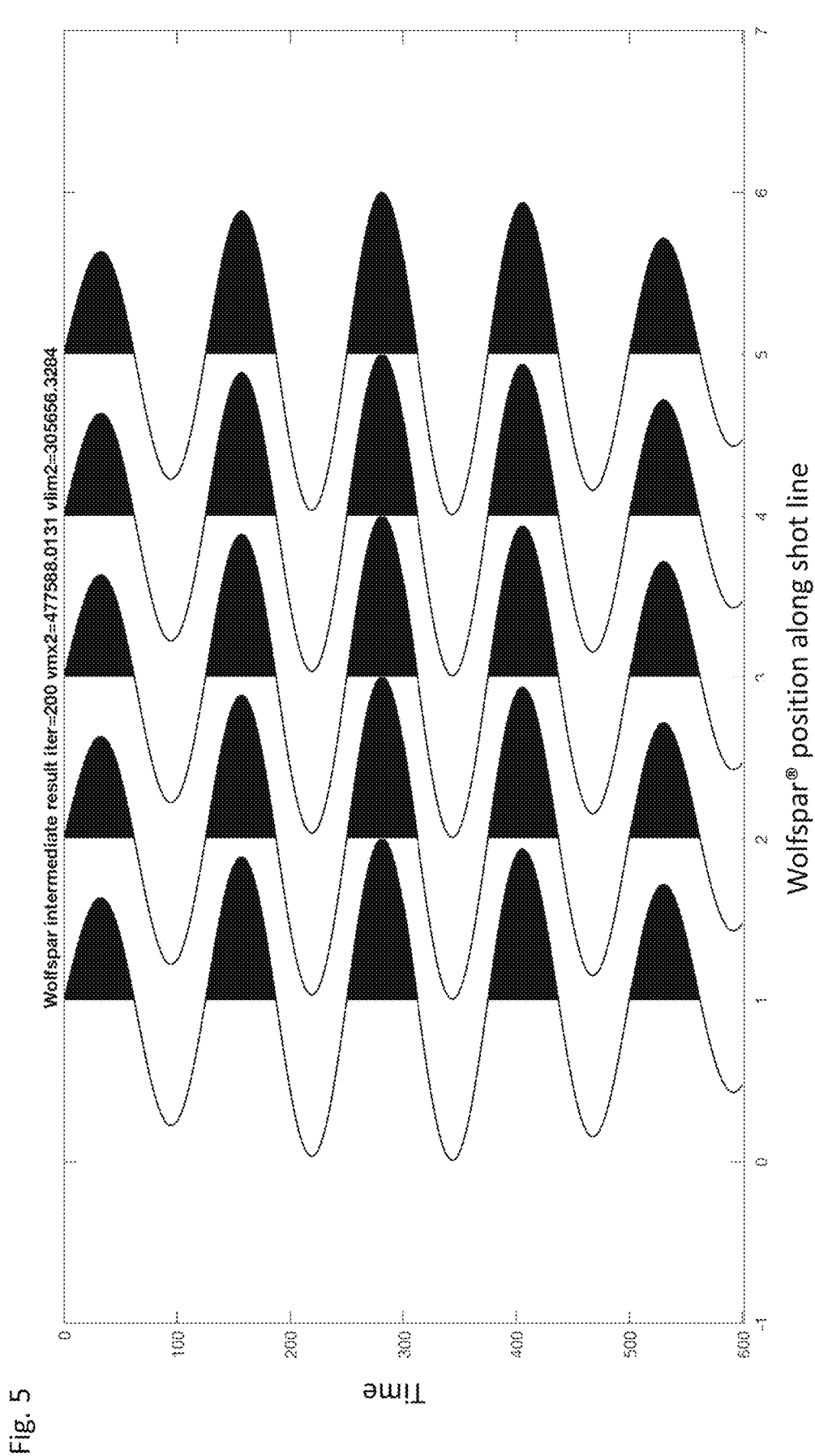
FIG. 5 illustrates data from one of the earner iterations for the second source after a smoothness constraint is applied.

One or more embodiments can use the Fourier transform, and start the thresholding at a level near 100%, only keeping the most coherent portion of the data. For example, FIG. 4 shows the inversion at an early stage, with a very strong coherency constraint producing an unnaturally smooth-looking result. The high threshold applied in the Fourier domain is only allowing through a narrow bandwidth around the frequencies where the air gun is strongest (around 8 Hz). With each iteration the threshold is lowered, finally allowing through all or nearly all the data in the final iteration(s). A preferred schedule for doing this is threshold=$1-(\text{iter}/\text{niter})^2$, where iter is the iteration count and niter is the number of iterations. A threshold of 1 allows through only the largest-amplitude single sample in the transformed data, 0.5 allows through the largest half of the transformed samples, and 0 allows through all the transformed data samples.

One or more embodiments can also use different smoothing thresholds for different source types as another way to stabilize the inversion when stronger and weaker sources are blended together. For example, one or more embodiments can follow the standard $1-(\text{iter}/\text{niter})^2$ thresholding schedule for the stronger source, but leave the threshold for the weaker source at a high level until the average data residuals had decreased to near the signal levels of the weaker source. Only then would one or more embodiments begin lowering the threshold when smoothing the weaker source.

Typically, one or more embodiments may also weight the data before or after transformation, for example to equalize amplitudes over offset, or to avoid one strong frequency band dominating (as illustrated in FIG. 4). Where the signal/noise is adequate, the weighting would typically be removed again after the thresholding. However, where the signal is weak or nonexistent, or the noise is strong, some embodiments might have used the weighting primarily to remove the noise. In that case, one or more embodiments would not remove the weighting after thresholding, to avoid re-introducing the previously removed noise. One or more embodiments can also take advantage of knowledge of how the data were acquired. For example, one or more embodiments can first interpolate in missing data using a method like POCS (projection onto convex sets), leaving the non-missing traces unchanged, and then apply a smoothness constraint in a second pass.

In a case like a combined low-frequency source and air-gun marine nodal acquisition, the air-gun shot lines can be closely spaced (for example, 50 meters apart). The ocean-bottom-node array deployment typically "rolls along" with the air-gun shot lines but can get somewhat ahead of the air guns. Thus, there is generally an interval near the midpoint of the survey when all (or nearly all) the nodes are simultaneously deployed, and the node patch is waiting for the air guns to catch up before retrieval begins. Around this time in the survey, just before the nodes start being retrieved instead of deployed, the low-frequency source arrives and traverses all its source lines. This is one way to design the survey in order to efficiently acquire the ultra-long-offset ultra-low-frequency data (that the low-frequency source was designed to acquire) into as many nodes as possible. Because the frequencies are so much lower, and the low-frequency acquisition is often only for the purposes of velocity-model building, not imaging, the low-frequency source lines can be much coarser than the air-gun source lines, allowing for a much speedier acquisition. The low-frequency source shots may only span two or three weeks, whereas the air-gun shots may span several months. Thus, there may be only a small percentage of air-gun shots that overlap with low-frequency source signals.

This allows some embodiments the freedom to treat the air-gun traces contaminated by overlapping low-frequency source signals as "missing". In some embodiments, early in the inversion, one or more embodiments can treat the contaminated air-gun shots as "missing traces" and interpolate them in the data. So long as there are not too many of them, this strategy can be viable. Later in the inversion once the data residuals have dropped, some embodiments can then switch to other smoothing methods, e.g., deblending the contaminated traces instead of throwing them away.

Typical vibratory sources produce one dominant frequency at a time, and achieve broader bandwidths by "sweeping" in frequency over time. In contrast, air-gun signals are impulsive and broadband. Thus, at any given time only a narrow frequency band of the air-gun signal is likely to be affected by interference, from the vibrator's signals. Thus, one or more embodiments can take advantage of this difference by individually flagging affected samples as "missing" in the frequency domain, instead of discarding entire Fourier-transformed air-gun traces. Since the smoothing criteria are often applied in the frequency domain, this is a straightforward extension. Vibrator signals are also commonly required to include "rest" phases, so that the vibrator does not operate continuously. These gaps may be long enough that for example every $3^{rd}$ or $4^{th}$ impulsive shot may entirely escape interference, from the vibratory source. At low frequencies these clean shots may be sufficiently oversampled that they can be used to interpolate in the contaminated intervening shots, which would be treated as "missing" in the early stages of the inversion.

Similarly, low-frequency source signals often last many times longer than the air-gun signals (typically 60-300 seconds versus 12-15 seconds), and thus only portions of individual low-frequency source sweeps will be contaminated by strong overlapping air-gun signals, and in some cases only for nodes that are sufficiently close by an operating air gun. One or more embodiments can flag all low-frequency-source trace samples that are contaminated by air guns above a certain amplitude level, and treat these as "missing" data to be interpolated in. The "treat as missing" flag can be individually specified sample, by sample in the time domain; it does not have to be trace by trace. There could be "treat as missing" flags in both the time and frequency domains, or any other domain or domains. The "treat as missing" flag could be a function depending on arguments in multiple domains. In some embodiments the flag could take on values between 0 and 1, allowing traces or samples to be down weighted but not completely disregarded, and/or replaced not by an interpolated value, but by a weighted average between the original value and the interpolated value.

One or more embodiments could use the known air-gun firing times to determine what samples are contaminated, but a simpler way to flag contaminated low-frequency source data samples is simply to look at the energy in a window around 8 Hz, the frequency where air guns are most dominant, and flag all samples where the energy in a window around that sample is above a certain level in that frequency band. A frequency of around 8 Hz is a good value for current air-gun arrays, but in general, some embodiments should use whatever frequency range is most appropriate for distinguishing the interfering source from the source being deblended. This also has the advantage of catching air-gun firings that were inadvertently not recorded, or air-gun shots that belong to a neighboring survey not captured in the sourcing log files.

One or more embodiments can modify the data acquisition to help ensure that this methodology works. In some embodiments, in any time window when the low-frequency source is operating, the method might only acquire odd-numbered air-gun source lines. This would guarantee that the method would have good uncontaminated data from the even-numbered source lines. As the low-frequency source signals only affect the lowest frequencies, one or more embodiments will only need to interpolate in "missing" data at the lowest frequencies. Double the cross-line sample spacing (for example, 50×2=100 meters) is still more than adequate sampling at these frequencies. At higher frequencies any low-frequency source contamination will be small enough that it can be ignored, and certain embodiments can use all the air-gun source lines. Certain embodiments could also avoid acquiring source lines divisible by 3, 4, or other increments, for example, when the low-frequency source was operating, the details of what is possible depending on the overlapping frequency ranges of the different types of sources and the source crossline spacings. The important observation is that at low frequencies typical survey designs are extremely oversampled, a fact that certain embodiments can use to their advantage.

The choice of how many dimensions and how to order the data when applying S can depend on details of the acquisition, and in general can vary with the type of source. Air-gun sources will generally be densely sampled on a regular grid (50 m by 50 m, for example), so certain embodiments have a wide variety of choices of ways to order the data in which it should be smooth. So, for example, for nodal acquisition, certain embodiments could apply the smoothness constraint $S_A$ to 3-D common-receiver gathers. For streamer acquisition, certain embodiments could work on 2-D or 3-D common vector-offset gathers. However, ocean-bottom nodes are typically not so well sampled (400-800 meters by 400 meters, for example). For air guns shot into ocean-bottom nodes, certain embodiments therefore could not use smoothness in a 3-D common-shot gather at conventional air gun frequencies, at least not without some processing to avoid aliasing as the density of sampling may be insufficient.

In contrast, a low-frequency source (e.g., an experimental source like Wolfspar®) may only be acquired on coarse widely spaced source lines, and so common-receiver low-frequency source gathers recorded into ocean-bottom nodes may only be sufficiently well sampled in 2-D, not 3-D, common-receiver gathers. For each node gather, the well sampled axes are the inline source position and time. The crossline source position is not sufficiently well sampled to be usable. However, because it operates at such low frequencies, the same receiver-node grid that is coarsely sampled at higher frequencies (above 2 Hz) can become well sampled for the purposes of a low-frequency source, meaning that unlike for air guns at conventional frequencies, one or more embodiments can apply $S_W$ in the 3-D common-shot-gather domain. Note there is no requirement that different sources or types of sources must all have the coherency/sparseness constraint applied in the same domain; each should use a domain and coherence constraint that is appropriate for that source.

This difference in what types of gather become "well sampled" (by the Nyquist criterion) over different frequency ranges is another reason that it may make sense to split up the problem by frequency band. This could be done simply by separating the original data out into overlapping tapered frequency bands, operating on each of these separately, and then re-merging the results back together, if desired. Or, the separation and re-merging could happen at an inner step of the algorithm, for example during the application of the smoothness constraint. Or, it could be done by using frequency-dependent weights or constraints within a unified overall inversion. The density of acquisition with respect to the frequency range will also dictate the possible choices of what grid to use for m, and what kind of smoothness constraint to apply. For example, whether to invert for a complete dataset with some missing shots interpolated in, or to only calculate unblended versions of the actual recorded shots. There can be good reasons to make different choices not just for different types of source, but for different frequency ranges of the same source.

Air guns are generally reliable, and if there is any problem with source positioning, the sub-optimal source points may simply be re-shot. One or more embodiments likely will not have that luxury for a new type of source, including a low-frequency source like Wolfspar®. As a result, there will sometimes be places where there are discontinuities or excursions in the source lines. This may cause problems in the smoothing step of the algorithm, because the discontinuity will cause even the correct data to not be smooth, which the smoothing step will attempt to "repair".

This is similar to a problem that occurred in wave-equation migration, when 2-D streamer acquisition was still the norm. The streamer lines might not lie in a straight line, but could have curvature due to varying cross currents during acquisition. The migration algorithms assumed the data was truly 2-D, not acquired along a twisting acquisition line. The method called "Azimuth Moveout" (AMO) was used to solve this. A simple brute-force method would be applied to flatten the reflectors in the data, using the known correct source and receiver positions. For example, the data could be flattened using normal-moveout correction (NMO), calculated using a very simple approximate velocity model. Then the inverse of that operation would be applied, but with the desired source and receiver positions. If the acquisition errors were not too large, the forward and inverse operations would nearly cancel each other out. Even a very approximate correction (because of the very simple approximate velocity model) would still work well enough in practice to show the data to then be treated as if it were 2-D for the purposes of migration and imaging. Certain embodiments can use the same principle for deblending, for example by replacing S with $(NMO^{-1}_{actual\_grid} NMO_{regularized\_grid})$ S $(NMO^{-}_{regularized\_grid} NMO_{actual\_grid})$.

In practice, certain embodiments likely would not apply the forward and inverse NMO operations separately, but would combine these into a single operation (as indicated by grouping the operations in parenthesis). Certain embodiments might also simply perform the smoothing directly on the NMO'd data, e.g., flatten the events, then perform the smoothing, then restore the events to their original locations. Mathematically, this replaces S with $(NMO^{-1}_{actual\_grid})$ S $(NMO_{actual\_grid})$. Alternatively, certain embodiments could have m represent the regularized acquisition, and adjust the formulas to suit by including the mapping from the regularized grid to the actual source/receiver positions in the blending operator Γ.

Clearly the method of one or more embodiments depends on "coherency-based signal extraction", the ability to distinguish desired arrivals from those due to interfering sources by their coherency (or lack thereof) in some domain. The data is acquired in a way that makes this separation possible. Hardware-generated random dithering of source initiation times has been the conventional preferred method to accomplish this described in the literature, but other methods have also been successfully used in practice. The time dithering can be algorithmic, not truly random, with a fixed repeating pattern of shot timing dithers pre-programmed into the logic of the source controllers. Several good methods for designing "optimal" dithering schedules have been described in the literature. In other cases, for example during land Vibroseis™ surveys, the dithering may be accomplished simply by allowing the operator of each source to choose when to fire it. This method relies on the actions of the unpredictable human operators to be sufficiently "random" to avoid unwanted coherence between different sources. In a marine survey, shooting on position instead of on time can introduce sufficient randomness. The varying currents and moving waves of the ocean will act to slightly advance and retard the motion of the acquisition vessel, effectively introducing environmentally generated random dithering into the source initiation times.

Depending on the acquisition geometry, the capabilities of the sources, and the choice of smoothing method, other ways of breaking up coherence between interfering events can also work well in practice. In one embodiment, the source initiation times are all periodic, but the periods are carefully chosen so that arrivals generated by one source can easily be separated from arrivals generated by other sources, FIG. 15 shows an example of a common-receiver gather combed using the initiation times of a first source. Event 1701 represents an arrival generated by the first source. In this domain, event 1701 is well sampled and has only slopes within a certain range of horizontal. A second source has a slightly longer period, such that events 1702 generated by the second source (but combed according to the times of the first source) all have much steeper slopes. Although events 1701 and 1702 are both well sampled within a coherency analysis window where they overlap (box 1710 showing one such possible coherency window), the events due to the two overlapping sources can easily be separated by their differing dips. By adding a dip-filtering step to the coherency-based signal extraction, the undesired interfering event can be identified by its unphysically steep slopes and rejected, and this can be enough for the algorithm to then converge to the correct result despite the perfectly regular periodicity of all the sources.

For other choices of the period of the interfering source, the events (such as 1703) can become so aliased that within an analysis window (box 1720) they effectively become a kind of noise, and this will result in them being rejected by the coherency-based signal extraction even without any additional dip filtering step.

If the interfering events have a markedly different signature (such as events 1701 and 1703 in FIG. 15), the separation could also be accomplished by analyzing the different sources in different domains. In FIG. 15 event 1701 is impulsive but events 1703 are smeared out in time. After appropriate filtering to shape the signatures, in another analysis window events from the source that generated event 1701 could become smeared in time, and events from the source that generated events 1703 could become impulsive, allowing one or the other event to be attenuated using an appropriate sparseness constraint.

In practice, it can be preferable to combine multiple methods of ensuring incoherence of interfering events. For example, in an embodiment the acquisition vessels would shoot on position, not time, ensuring that some natural randomness is added to the source initiation times. However, the target speeds of the source vessels would then also be chosen to be different, such that even in the absence of natural time dithering (for example if the seas happened to be perfectly flat at some point in the survey) the sources would still beat with each other in such a way that within an analysis window only one source at a time would appear to be coherent.

For sources of differing types that may have very different nominal repeat intervals, the more general design goal is to design the survey such that no two different sources ever "beat" with each other, i.e. no small integer multiples of the nominal source repeat intervals coincide for any combination of different sources. Vessel speeds will typically vary within a narrow operational range, so that the undithered source time interval when shooting on position also varies over some range, and this uncertainty generally needs to be accounted for. For example, suppose there are airguns shooting on position, and a low-frequency vibratory source shooting on time. For the nominal separation between shot points, the airgun source repeat interval can vary between 11 and 12 seconds, depending on the vessel speed. By the survey design the low-frequency source (shot on time) should have a nominal undithered repeat interval somewhere in the range of 100-120 seconds, the precise value being a design parameter that can be chosen. One or more embodiments can then ensure that the law-frequency source cannot be coherent with the airguns by choosing a repeat interval of 109 seconds. This increment is not an integer multiple of the airgun repeat interval for any value between 11 and 12 seconds. Mathematically, 9×11 to 12 seconds gives a range of 99 to 108 seconds, and 10×11 to 12 seconds gives a range of 110 to 120 seconds. Given an allowable design range of 100 to 120 seconds, one or more embodiments can choose a value between 108 to 110 seconds to avoid any possibility of "beating" with the airguns. If another nearby seismic survey is shooting on time instead of position, 109 seconds being prime is also not a multiple of any integer-second repeat interval of less than 109 seconds. Thus, by choosing a repeat interval of 109 seconds, one or more embodiments can minimize the chance of inadvertent coherency between the low-frequency source and any airguns. Those of ordinary skill in the art will readily appreciate how to apply these principles to other survey designs.

All of these different options described in the preceding paragraphs (both for the outer signal separation algorithm and the coherency-based signal extraction algorithms that are repeatedly used within it) may be combined in a variety of permutations. Clearly many methods are possible, depending on the number and types of sources, their acquisition geometries, the choice of grid to represent the result, the frequency range under consideration, the signatures and spacings of the sources, and/or the desired application. In particular, one or more embodiments can have any number of different types of sources, and any number of sources of each type. The sources may be combined or kept separate in any possible combination. One or more embodiments may combine all the sources onto a single output, or have one output for each source, or one output for each type of source, or any combination in between, combining some sources on output but not others, etc.

Thus, in some embodiments, the application of the instant inversion process provides reasonably clean receiver gathers that may be used both for imaging, prestack analysis such as AVO (Amplitude Vs. Offset) analysis, and velocity-model building, for example, by Full-Waveform Inversion (FWI).

Acquiring seismic data with shots where the recorded information from one shot overlaps in time with other shots has the potential to significantly reduce the time (and cost) required to shoot a seismic survey. This approach might also allow more closely spaced shot point intervals (e.g., during a marine survey) that could potentially provide better seismic images that would improve the chances of discovering economic quantities of oil and/or gas. Allowing multiple types of sources to be acquired simultaneously allows for broader-bandwidth data to be acquired with the same efficiency as conventional air-gun data.

Figure 8:
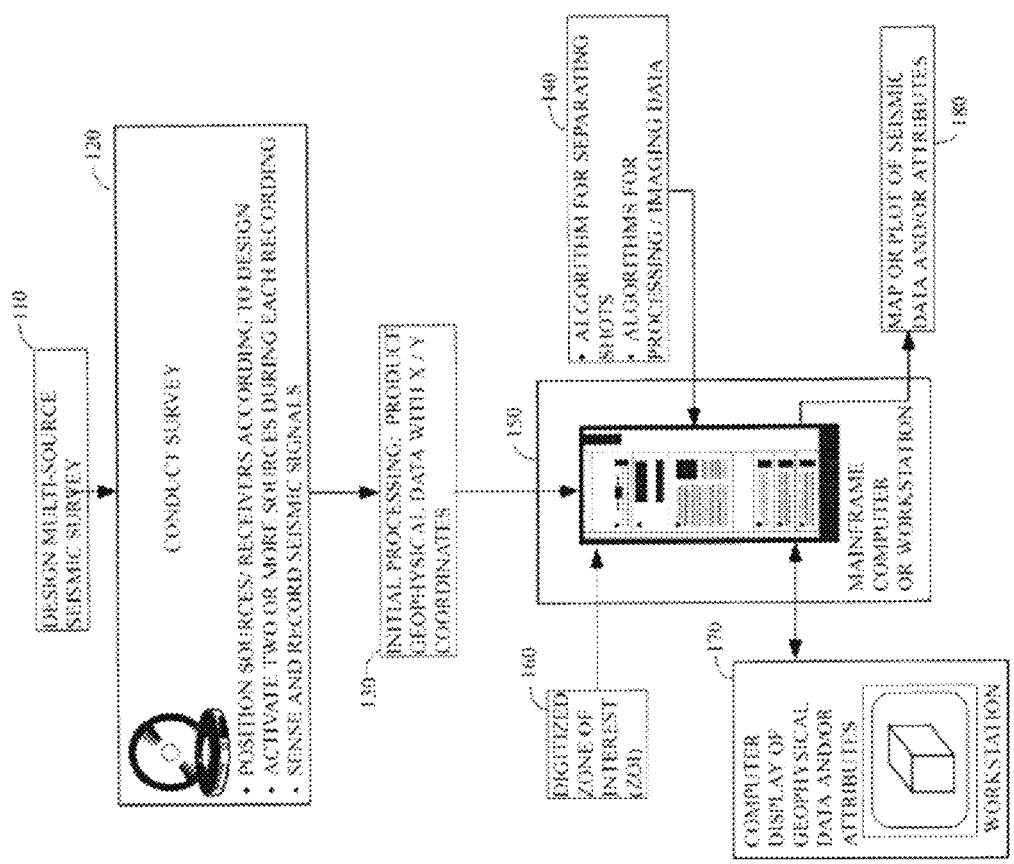
FIG. 8 illustrates the general environment of the instant disclosure.

To provide context for the acquisition system, FIG. 8 illustrates the general environment in which the instant disclosure would typically be used. A seismic survey is designed 110 by the explorationist to cover an area of economic interest. Field acquisition parameters (e.g., shot spacing, line spacing, fold, source type, etc.) are typically selected in conjunction with this step, although it is common to modify the ideal design parameters slightly (or substantially) in the field to accommodate the realities of conducting the survey.

Seismic data (i.e., seismic traces) are collected in the field 120 over a subsurface target of potential economic importance and are typically sent thereafter to a processing center 150 where the traces will be subjected to various algorithms to make them more suitable for use in exploration. In some cases, there may be some amount of initial data processing performed while the data are still in the field and this is becoming more common and feasible given the computing power that is available to field crews. As described above, within the field 120, there may be two more overlapping simultaneous sources of a same type, and/or there may be two or more overlapping simultaneous sources of different types. As described above, the recordings of different sources may have been combined in a single volume.

In the processing center, a variety of preparatory processes 130 are typically applied to the seismic traces to make them ready for use by the explorationist. The processed traces would then be made available for use by the instant systems and methods and might be stored, by way of example only, on a storage device such as a hard disk, magnetic tape, solid state drive, magneto-optical disk, DVD disk, or other mass storage means.

The methods disclosed herein can be implemented in the form of a computer program 140 that has been loaded onto a programmable computer 150 where it is accessible by a seismic interpreter or processor. Note that a computer 150 suitable for use with the instant disclosure would typically include, in addition to mainframes, servers, and workstations, super computers and, more generally, a computer or network of computers that provide for parallel and massively parallel computations, wherein the computational load is distributed between two or more processors. As is also illustrated in FIG. 8, in some embodiments, some sort of digitized zone of interest model 160 may be specified by the user and provided as input to the processing computer program. In the case of a 3-D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant systems and methods and those skilled in the art will recognize that this might be done any number of ways.

A program 140 embodying the instant processes might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network (e.g., a wired or wireless network, etc.). In a typical seismic processing environment, the methods of the instant disclosure would be made part of a lamer package of software modules that is designed to perform many of the processing steps listed in FIG. 9. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 9:
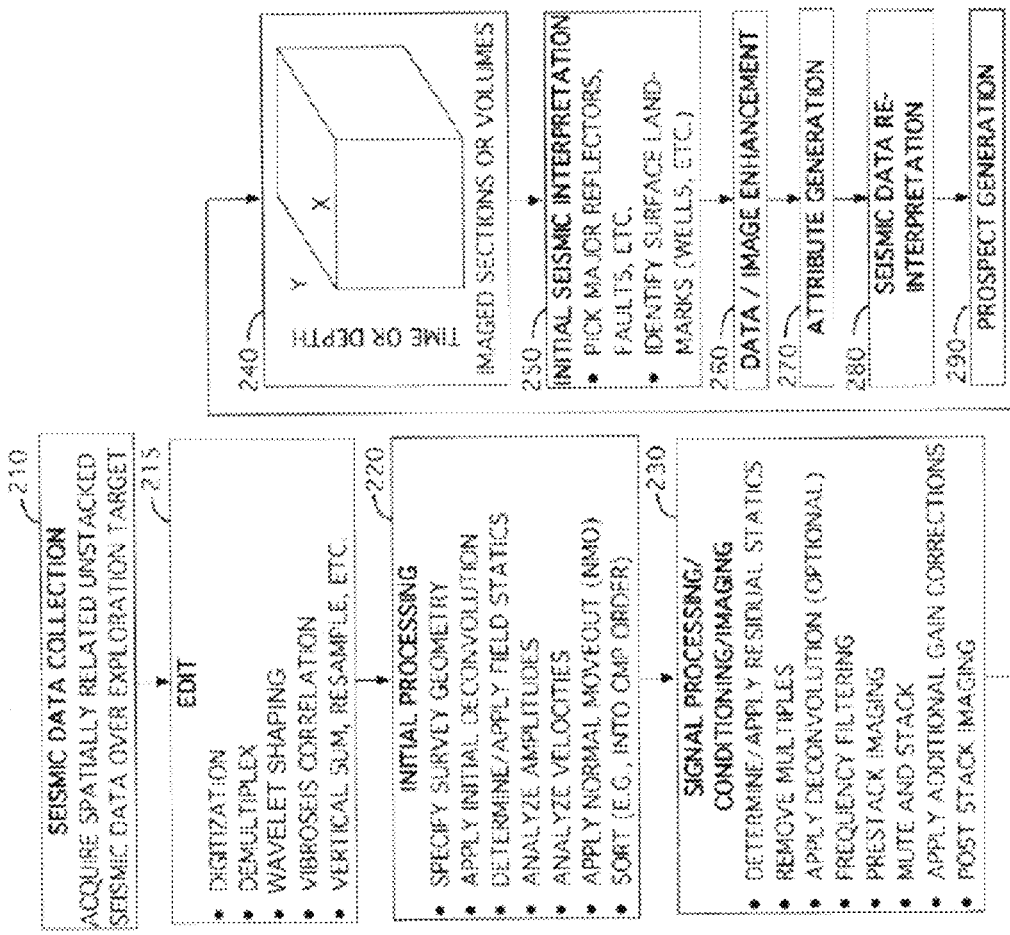
FIG. 9 illustrates a seismic processing sequence suitable for use with the instant disclosure.

As was indicated previously, the instant disclosure will preferably be made a part of and incorporated into a conventional seismic processing sequence of the sort generally described in FIG. 9. Those of ordinary skill in the art will recognize that the processing steps illustrated in FIG. 9 are only broadly representative of the sorts of processes that might be applied to such data and the choice and order of the processing steps, and the particular algorithms involved, may vary markedly depending on the individual seismic processor, the signal source (dynamite, vibrator, air gun, low frequency generator, etc.), the survey location (land, sea, etc.) of the data, the company that processes the data, etc.

As a first step, and as is generally illustrated in FIG. 9, a 2-D or 3-D seismic survey is conducted over a particular volume of the earth's subsurface (step 210). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art. Note that for purposes of the instant disclosure, the seismic survey will be a blended source survey wherein reflections from a later source activation may interfere with (or coincide in time with)) reflections from an earlier one. After the shots or sources have been separated according to the instant disclosure, the unstacked seismic traces resulting from that operation are useable as would be any other collection of seismic traces. Thus, the present systems and methods allow multiple seismic traces to be obtained from sources that are activated to produce overlapping signals, where the resulting separated seismic data sets are equivalent to or substantially equivalent to seismic data sets obtained using fully separated source activations and seismic data acquisitions (e.g., non-overlapping sources and unstacked seismic traces).

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3-D seismic survey or, preferably, an unstacked 3-D portion of a 3-D seismic survey. The systems and methods disclosed herein are most effective when applied to a group of stacked seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces could conceivably be used.

After the seismic data are acquired (step 210), they are typically taken to a processing center or processed in the field where some initial or preparatory processing steps are applied to them. As is illustrated in FIG. 9, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset. In some embodiments, the instant disclosure might be utilized in connection with step 215, i.e., in conjunction with or in place of the wavelet shaping/Vibroseis® correlation steps, although it could certainly be utilized elsewhere within this generalized processing scheme.

After the initial pre-stack processing is completed, it is customary to condition the seismic signal on the unstacked seismic traces before creating stacked (or summed) data volumes (step 230). In FIG. 9 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2-D data, a stacked seismic line for use in the exploration for hydrocarbons within the subsurface of the earth.

As is further suggested in FIG. 9, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores; etc.) to locate subsurface structural or stratigraphic features conducive to the generation, accumulation, or migration of hydrocarbons (i.e., prospect generation 290).

Turning to the systems and methods disclosed herein, a method can include separating two or more seismic sources that have been activated during a single recording session, where similarity between nearby shots is used to constrain the inversion process and create a plurality of separated seismic data sets.

Figure 10:
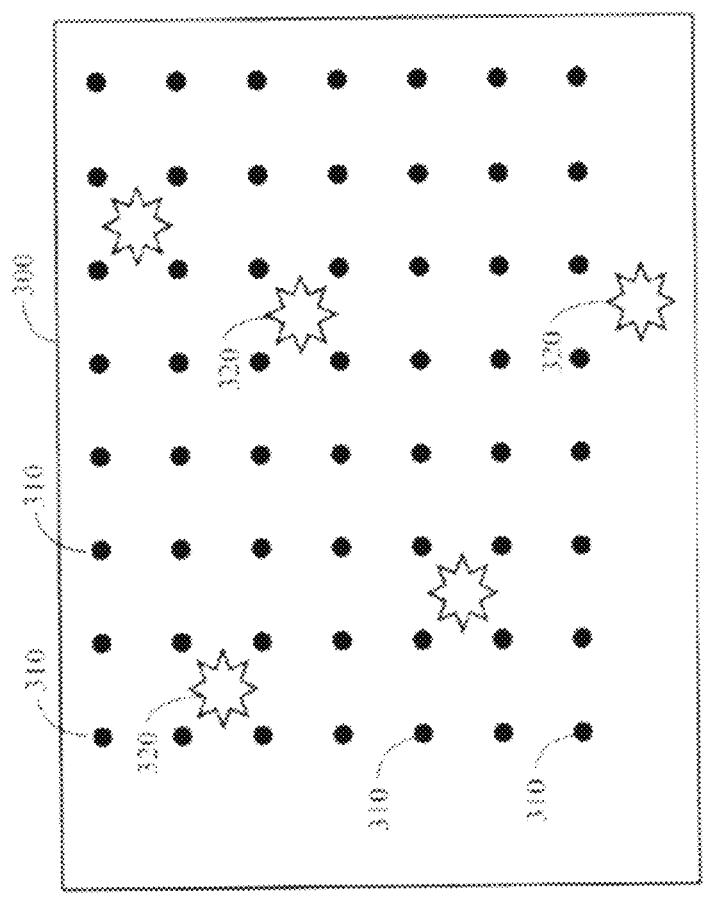
FIG. 10 contains a plan view schematic of a typical blended source survey.
Figure 11:
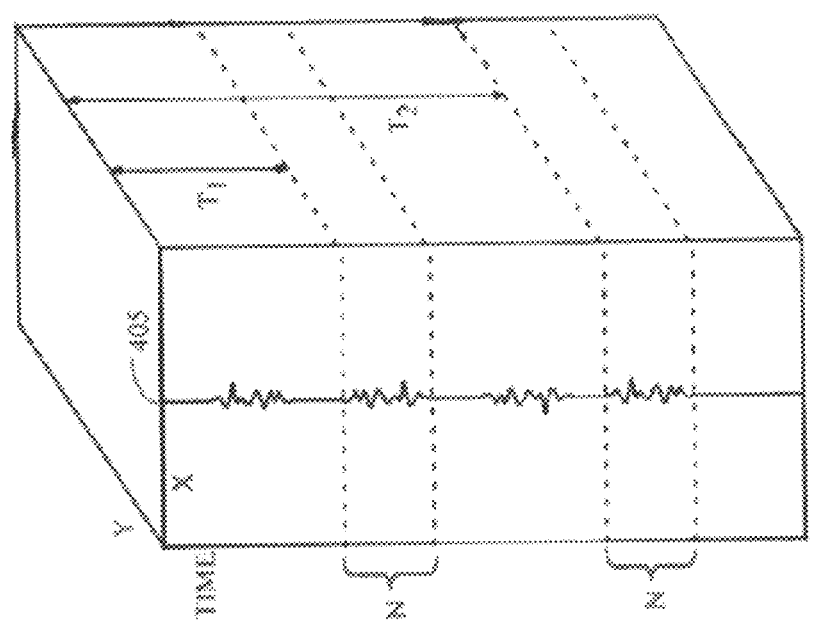
FIG. 11 illustrates schematically how different shots may be identified and extracted within the blended source survey.

Referring to FIGS. 10 and 11, a blended source survey can be collected by first laying out a number of receivers 310 in a 2-D configuration over a target of exploration interest. In some embodiments, there may be only a few or as many as several thousand receivers 310 in the survey. The receivers 310 might be connected by cables to a central recording unit; they might use wireless transmission to same; or each receiver might contain some amount of internal data storage in which to record the seismic signals received thereby. Those of ordinary skill in the art will be quite familiar with these sorts of receiver variations.

In some embodiments, the receivers 310 will be continuously recorded for an extended period of time. In some variations, the receivers might be recorded for a few hours, one-haft day, a full day, multiple days, etc. The only requirement is that the recording must capture at least two source excitations. This is in contrast to the usual seismic survey, wherein the receivers are recorded for only a few seconds after the activation of a source.

During the time period that the receivers are being recorded, a number of seismic sources 320 will be activated at different locations within the survey area 300. In some embodiments, two or more sources will be used, where the sources can have different source signatures and/or frequency ranges, including any of those described herein. In the case of a marine survey, it is likely that different types of sources will be used but that obviously is something that is left to the discretion of the survey designer.

The two or more seismic sources 320 can include any number of discrete or continuous sources. In the marine context, the seismic sources 320 can include one or more air guns; sparkers, vibrators, or the like. In some embodiments, any number, volume and type of seismic sources may be included in an array. As an example, an array can include one or more large volume air guns, one or more medium volume air guns, and/or one or more small volume air guns. The seismic sources can be arranged in various arrays. For example, a collection of seismic sources can be positioned to be proximate to each other and intended to be activated as part of the same seismic shot. In a marine context, this might be a single seismic array of sources or multiple source arrays towed by one or more boats. A subarray (which might consist of one or more sources) will be understood to be a subset of the sources, with the source(s) assigned to each subarray being intended to be activated simultaneously.

On land, the two or more sources 320 can include vibrators, charges, or humming seismic sources. For example, the two or more sources 320 can include land vibrators (e.g., 10 or so), Mini-Sosie™ surveys, weight drop surveys, etc. One type of seismic surveying system uses a vibrator or group of vibrators to provide the source of the acoustic energy (hereinafter referred to as "Vibroseis source"). A Vibroseis source may generate ("vibrate") the acoustic energy waves at predetermined vibrator points (VPs). The VPs may be marked with a stake placed by surveyors. Alternatively, global positioning satellite (GPS) equipment may be used to locate predetermined VPs.

Other sources can include low-frequency sources such as those used in marine surveys, including Wolfspar® sources. The low-frequency sources could each operate at a single frequency ("monochromatic" low-frequency sources) or cycle, between two or more discrete frequencies ("stepped-frequency" low-frequency sources), or sweep over a narrowband range of low frequencies designed to augment the frequency range produced by the broadband sources ("narrowband" low-frequency sources). The sources could operate to produce waves of constant amplitude, or the amplitude of the waves could vary (taper up and down). In this context, "low-frequency" means frequencies less than about 6-8 Hz. Some embodiments will be below about 4 Hz, some of which may employ frequencies as low as about 2 Hz, or about 1.5 Hz, or about 0.5 Hz.

In some embodiments, the two or more seismic sources 320 can have different signatures. In Vibroseis operations, the vibrator(s) of the Vibroseis source typically generates a vibration pattern that changes frequency over a predetermined period of time. This vibration pattern is referred to as a vibratory sweep. A typical Vibroseis sweep may be a linear frequency sweep from approximately 5 Hz to 100 Hz and may have a duration of the order of 5 to 30 seconds. Air guns can generate high-frequency acoustic waves. The low-frequency sources can generate low-frequency signals over a longer time period, and in some embodiments, the low-frequency sources can operate continuously.

In some embodiments, the source activations will be separated in time by random time periods. Further, the sources can be activated close enough in time that there will be some overlap or blending between the shots. When the seismic records are corrected for each source's zero time (i.e., activation time), the reflections related to that source will tend to be coherent, but the energy from interfering sources will tend to be incoherent (e.g., the reflections will not line up) since the delay between shots is random. That is, for example, in the case of a survey where each source 320 is a Vibroseis unit, it is anticipated that the source activations might be separated by a few seconds in some cases. Note that FIG. 10 is not intended to suggest that each source 320 will be activated simultaneously but instead is indicated to indicate that each source is located at a different location within the survey area 300. During some surveys, ten or more different sources might be used. As an example an exploration method that would produce data that would be suitable for use with the instant disclosure, attention is drawn to WO 2008/025986 (PCT/GB2007/003280) "Seismic Survey Method" which names Howe as its sole inventor, which application is incorporated herein by reference in its entirety. Howe discusses the use of staggered activation of vibrator activations wherein there is some overlap in the returning subsurface reflections.

While the seismic sources 320 can comprise discrete or semi-discrete signatures, one or more of the seismic sources can operate continuously based on a continuous firing pattern or as a continuous emission source. In some embodiments, the method may include continuous shooting, which may also be referred to as "continuous patterned shooting" or "continuous firing patterns." Specifically, instead of shooting one firing pattern and then shooting a different firing pattern, there is no time delay and one continuous firing pattern is used, that is continuous popcorn type firings for the case of air gun arrays. As such, in some embodiments, there may be gaps of a few to several seconds between two firing patterns, but there need not be. For low-frequency sources, the low-frequency source can operate continuously over a given time period to produce the low-frequency energy in a continuous manner.

As described above, different types of sources can have different characteristics. The different sources having the different signatures and/or frequency ranges can allow for the differences in the source signatures, relevant coherency criteria, and acquisitions processes (e.g., 2-D acquisition, 3-D acquisition, etc.) to provide better separation in the acquired data. Exemplary source combinations can include the use of air-guns with vibrators, air-guns with sparkers, air-guns with a low-frequency source (e.g., a Wolfspar source, etc.), or combinations of three or more source types.

FIG. 11 suggests, in a general way, what the data from a blended source survey might look like. Each receiver 310 will give rise to a seismic trace (e.g., trace 405) that could potentially be tens of minutes or several hours (or days, etc.) in length. In this figure, the trace 405 is shown schematically as containing recorded signals from four different source excitations. While the illustrated signals are shown as being similar, the recorded signals may have signatures matching the source. When multiple sources having different source signatures are used, the signals may have correspondingly different signatures. Associated with each receiver 310 will be a location on the surface of the earth. When the signals that have been recorded from each receiver 310 are properly arranged and displayed, in some embodiments a 3-D volume will be produced with each receiver 310 being associated with an "X" and a "Y" location, to include locations based on latitude and longitude, etc.

Preferably, during a blended source survey the time at which each source 320 is activated will be noted and recorded, which sources might be located inside or outside of the receiver field. In FIG. 11, $T_1$ and $T_2$ represent the known times (as measured from an arbitrary zero time) at which two sources were activated, with the parameter "N" indicating in a general way the length of time (and/or a number of samples) after the source activation during which reflections from the subsurface from this source might be sensed. In this particular example, and as will be explained in greater detail below, the two source activations can be from the same source (e.g., two Vibroseis sweeps) so they do not overlap in time. However, with other embodiments, the source activations can be from different sources. In this arrangement, interference will most likely come from other seismic sources that were activated during the time window indicated or that had subsurface reflections arriving during this same time interval. That being said, the instant processes would be applied in the same fashion if the two or more source activations from the same source were to overlap in time.

The generation of the plurality of separated seismic data sets can generate seismic data useful for various subsequent processing techniques, as described here. In some embodiments, the resulting separated seismic data sets can include different seismic trace data. For example, a first set of seismic data (e.g., $m_1$) can comprise standard separated seismic trace data useful for traditional processing and imaging. Alternatively, or as a second separated seismic data set (e.g., $m_1$, $m_2$, . . . $m_n$, etc.), the resulting separated seismic data set can be used for other forms of processing. It should be appreciated that the inversion process disclosed herein can allow for some elements of the individual separated seismic data sets to be interpolated based on the iterative application of the inversion process. This may allow for some portion of the resulting separated seismic data sets to be created based on the overlap between the two source excitations, which can produce more complete separated data sets.

In some embodiments, one or more of the separated seismic data sets can be used for the purpose of full-waveform inversion ("FWI") analysis. FWI is a time or frequency-based seismic processing technique that provides a more general paradigm for imaging subsurface structures: instead of relying solely on reflected or scattered waves echoing off of geological discontinuities in the Earth, FWI also makes use of transmitted/refracted waves that travel downwards, then turn to become horizontal, and finally turn upwards to emerge as up going seismic waves (possibly at a considerable distance from their origin). Subsurface structures in the Earth advance, retard, and/or distort these transmitted/refracted diving waves by their presence, and FWI solves for their location and properties from the characteristic imprints these leave in the data. Note that, without low-frequency wide-offset data which contain the transmitted/refracted waves, full-waveform inversion often fans and may not resolve the subsurface structures (i.e. can produce a useless result). Unfortunately, traditional seismic sources do not provide the low-frequency waves that would generally be desired and, more particularly, the low-frequency data that may be used when full-waveform inversion is performed. Thus, the separation and generation of the separated seismic data sets can be used to allow for the desired seismic processing. While FWI is a natural application of this method, other uses of the separated data that do not involve imaging or velocity determination are possible.

Figure 12:
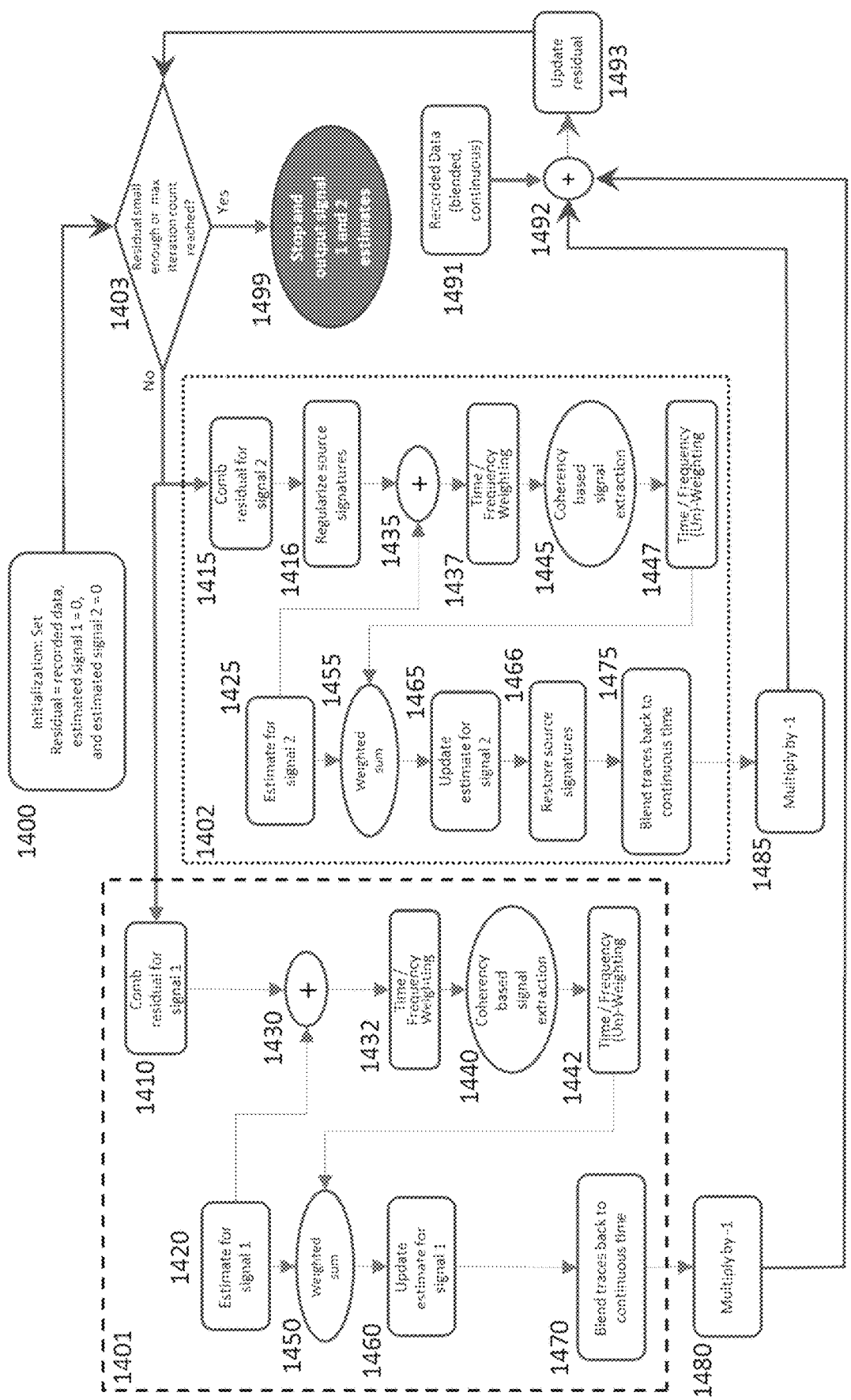
FIG. 12 illustrates an example operating logic for a representative case where source 1 is impulsive and source 2 is vibratory, with a varying source signature.

Having described the different types of sources, the general inversion model, and the types of desirable output seismic data, the description now turns to processes useful in implementing the models. FIG. 12 illustrates a logical process flow that would be suitable for use when the sources for a blended survey are one or more airguns and one or more seismic vibrators (e.g., a Vibroseis survey). Those of ordinary skill in the art will readily appreciate how to generalize the process flow of FIG. 12 to the case of 3 or more types of sources. The process can be considered as proceeding over 3 nested layers, the outermost of which comprises boxes 1400, 1403, 1499, 1491, 1492, 1493, 1401, 1402, 1480, and 1485.

Step 1400 is initialization. Three data buffers are created, one to hold the residuals, one to hold the deblended airgun data (signal 1), and one to hold the deblended Vibroseis data (signal 2). The residual is initially just a copy of the recorded seismic data, and the two deblended signal buffers are initially set to contain all zeroes.

Step 1403 is a check of whether the inversion is done. This can happen either because the residual (the difference between the actual recorded data and the predicted recorded data) is sufficiently small, or because a maximum iteration count has been reached. If the condition is met, the deblended data (consisting of the two estimated signal traces) are output at step 1499. Otherwise, the new residual is fed into boxes 1401 and 1402, one iteration of deblended source estimation for airguns and Vibroseis, respectively. Each of these boxes is individually analogous to the method described in U.S. Pat. No. 8,295,124 B2, Abma, in particular the steps described in FIG. 8 of Abma in steps 815 to 875. The subject matter of U.S. Pat. No. 8,295,124 B2 is incorporated herein in its entirety. Each of 1401 and 1402 outputs an updated estimate of the recorded data that would have been recorded if only the corresponding source type had been active (the airgun for 1401, and the Vibroseis for 1402), and the data for that source type had been acquired in a traditional unblended acquisition. These are then negated, the airgun data in box 1480 and the Vibroseis data in box 1485.

The negated single-source-type predictions are then summed in box 1492 with the recorded data (box 1491), producing the updated residual. The newly updated residual is stored in its data buffer (box 1493) and then passed into box 1403. The process repeats until termination. Note that if the prediction were perfect, then the unblended single-source-type predictions would sum to the actual recorded data, and the output of box 1492, the newly updated residual, would be identically zero. In practice, at the termination of the process the residual will contain incoherent noise, and the deblending algorithm thus will have the desirable side effect of also de-noising the data. At least in theory, blended acquisition should produce a better result than traditional unblended acquisition, because a shorter acquisition time means there is a smaller amount of noise for the same quantity of signal.

The intermediate layer comprises the insides of boxes 1401 and 1402. First, the residual is combed (1410, combed using the airgun times, and 1415, combed using the Vibroseis times). The buffers containing the current estimated deblended data (box 1420 for the airgun, and box 1425 for the Vibroseis) are then accessed and each is summed with the corresponding combed residual, in box 1430 for the airguns and 1435 for the Vibroseis. The Vibroseis processing sequence contains the extra step of regularizing the source signature (box 1416), either using a signature deconvolution, signature correlation, matching filter, etc. A workflow, such as the workflow described by Abma in U.S. Pat. No. 8,295,124 B2, would immediately proceed to the step of smoothing the data to extract the coherent signal (box 1440 for the airgun, and box 1445 for the Vibroseis). When separating different types of sources, it may be necessary to balance their amplitudes. Otherwise, one source type may dominate over the other and the method may not converge. It is also not useful to attempt to produce coherent signal that is not there, for example attempting to find coherent signal above 4 Hz for a low-frequency source that produces little to no energy in that frequency band. Attempting to do so will only accentuate noise, again resulting in the method not converging to a usable result. Thus the modified method includes an additional time frequency weighting step not found in Abma, box 1432 for the airguns and box 1437 for the Vibroseis. The function of these is to balance the relative strengths of the different types of sources, and to attenuate frequencies not produced by the corresponding source. The method then proceeds to coherent signal extraction (steps 1440 for the airgun and 1445 for the Vibroseis) as before. Optionally more time/frequency weighting may be applied in steps 1442 and 1447 to partially or wholly remove the weights applied in 1432 and 1437, respectively. If the weights were applied to suppress noise, then they would not be removed at this step. The result is an update to the estimated deblended signals, which are added to the previous estimate in steps 1450 and 1455, to produce updated deblended signal estimates for the airguns and Vibroseis, respectively. The updated deblended signal estimates are stored in their respective data buffers in steps 1460 and 1465. The deblended traces are then de-combed in steps 1470 and 1475 for the airguns and Vibroseis, respectively. The Vibroseis flow contains the additional step at box 1466 of removing the source signature applied in box 1416.

Figure 13:
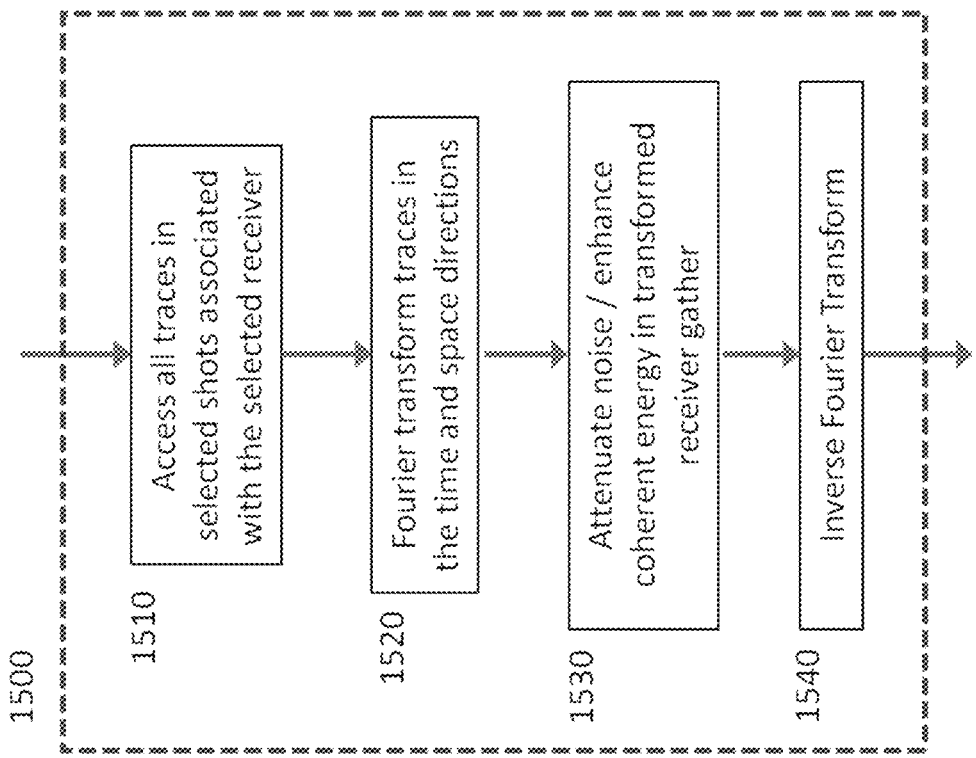
FIG. 13 illustrates an example method for extracting coherent signals from a noisy gather.

The innermost layer occurs inside boxes 1440 and 1445, coherent signal extraction. FIG. 13, box 1500, contains a standard approach, as described in Abma for the case of a single type of source, and thus box 1500 could represent the contents of boxes 1440 or 1445. The data are organized into an appropriate gather where the desired signal should be coherent in box 1510. It is then Fourier transformed in box 1520, such that the desired signal should become "sparse" in that domain. The smaller values in the transformed space are zeroed at step 1530, to leave the signal untouched while attenuating the noise. The data are then returned to the original domain at step 1540.

As in Abma, the data will generally be broken up into overlapping N-dimensional subcubes, with appropriate tapering in the overlap zones, and this operation will be performed in each subcube, and the results then merged back together to reconstitute a de-noised version of the original data.

Figure 14:
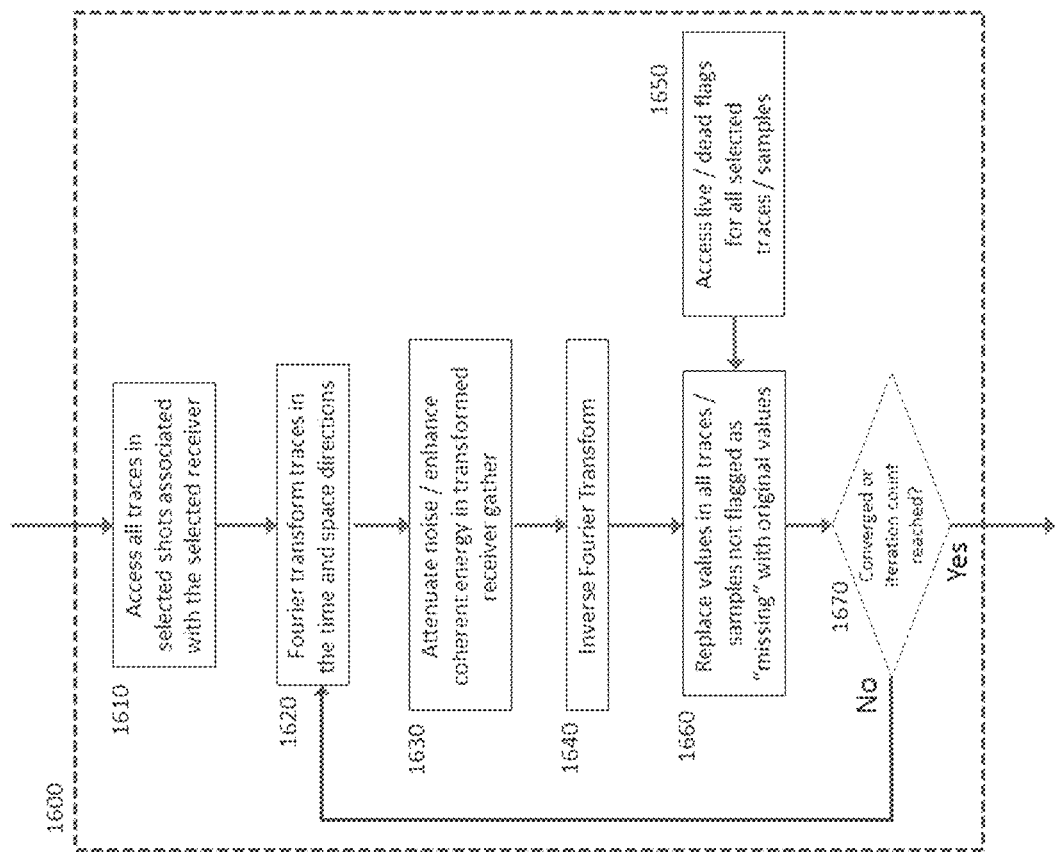
FIG. 14 illustrates an example method for replacing "missing" or "contaminated" traces in a gather using POCS interpolation.

An alternative method that can be particularly useful when deblending different types of data is shown in FIG. 14, box 1600. It can be used in place of box 1500, or it can be used first and then the method in 1500 can follow. In this method the contaminated traces are marked as "dead" or "missing", and standard methods for filling in missing data by interpolation are used to replace the contaminated traces. The method shown in box 1600 is "POCS interpolation" (Projection Onto Convex Sets). The contaminated or missing traces will have previously been identified, and this information is retrieved in box 1650.

As in box 1500, first the data are organized into appropriate gathers (box 1610). Then the data are Fourier transformed (box 1620) to become sparse, the smaller values are zeroed or reduced (box 1630) and the data are transformed back to the original domain (box 1640). The difference is that at step 1660 the traces that did not need to be interpolated are replaced with their original values. At step 1670 the result is compared to the previous result, and if it has stopped changing (or the maximum iteration count has been reached) the process exits. Otherwise, the data containing the newly interpolated "missing" traces are sent back for another iteration at box 1620.

FIGS. 12-14 demonstrate a particular set of preferred embodiments. Those of ordinary skill in the art should readily see how to generalize the method to other cases, and how to incorporate the many possible alternative options described earlier in the description into the basic workflow.

R should also be noted that Abma demonstrated two approaches: a constructive approach and a deconstructive approach. The same possibilities apply here. The above disclosure has described the generalization of the "constructive approach" to datasets of two or more mixed source types. Those of ordinary skill in the art should readily be able to see how to similarly generalize the methods described here to use the "deconstructive approach".

It should be noted that when operations are to be performed on traces of a particular type (e.g., a receiver gather), it is normally not necessary to bring those seismic traces together in memory (e.g., via a sort) in order to apply multi-trace processes to them. Thus, in the disclosure above and the claims that follow, when it is said that a gather (e.g., shot gather, receiver gather, etc) is assembled or accessed for further processing, those words should be interpreted in their broadest sense to cover instances where the traces that comprise the gather are processed in place or on the fly. Thus, no sorting or other arranging of the data may necessarily be required.

Further, in some embodiments the instant systems and processes will be adapted for use with a VSP or similar downhole survey. By way of explanation, those of ordinary skill in the art will understand that VSP acquisition can be very expensive in terms of rig down time. Shooting faster VSPs with overlapping sources could be used to significantly reduce the costs of such surveys. Thus, when the phrase "blended seismic survey" is used herein, that phrase should be broadly interpreted to include both land and marine 2-D and 3-D surveys as well as VSPs, cross hole surveys, etc.

Further, in the previous discussion, the language has been expressed in terms of operations performed on conventional seismic data. But, it is understood by those skilled in the art that the disclosure herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, VSP data, full waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example: filtered data traces, migrated data traces, frequency domain Fourier transformed data traces, transformations by discrete orthonormal transforms, instantaneous phase data traces, instantaneous frequency data traces, quadrature traces, analytic traces, etc. In short, the process disclosed herein can potentially be applied to a wide variety of types of geophysical time series, but it is preferably applied to a collection of spatially related time series.

Having described various systems and methods, certain aspects can include, but are not limited to:

in a first aspect, a method of seismic exploration above a region of the subsurface containing structural or stratigraphic features conducive to the presence, migration, or accumulation of hydrocarbons comprises accessing at least a portion of a blended seismic source survey, wherein the blended source seismic survey contains at least two interfering seismic source excitations therein, wherein the seismic source excitations are produced by one or more seismic source types. The seismic source types can have different signatures or frequency characteristics; separating the at least two interfering seismic source excitations using inversion separation; producing one or more source gathers based on the separating; and using the one or more source gathers to explore, for hydrocarbons within said region of the subsurface.

A second aspect can include the method of the first aspect, wherein separating the at least two interfering seismic source excitations comprises: selecting a first coherency constraint for a first seismic source type of at least two seismic source types; selecting a second coherency constraint for a second seismic source type of the least two seismic source types; and applying the first coherency constraint and the second coherency constraint in the inversion separation to the portion of the blended seismic source survey, wherein producing the one or more source gathers is based on applying the first coherency constrain and the second coherency constraint.

A third aspect can include the method of the second aspect, wherein the first coherency constraint and the second coherency constraint are different.

A fourth aspect can include the method of any one of the first to third aspects, wherein separating the at least two interfering seismic source excitations comprises: determining activation times for each interfering seismic source excitation of the at least two interfering source excitations; and using the activations times corresponding to each seismic source excitation to shift the at least two interfering seismic source excitations to a zero time, wherein producing the one or more source gathers is based on shifting the at least two interfering seismic source excitations to the zero time.

A fifth aspect can include the method of any one of the first to fourth aspects, wherein separating the at least two interfering seismic source excitations using inversion separation comprises solving an equation having the form:

$$d = \Gamma_1 m_1 + \Gamma_i m_i + \ldots + \Gamma_n m_n,$$

for the matrices $m_1, m_i \ldots m_n$, to produce the one or more source gathers, wherein n can be greater than or equal to 1, wherein $m_1$ can be a first source gather of the one or more source gathers, $m_i$ is another source gather of the one or more source gathers; d is a matrix representation of the recorded seismic data, $\Gamma_1$ is a matrix that defines excitation times of a first source type of one or more seismic source types, and $\Gamma_i$ is a matrix that defines excitation times of another source type of the one or more seismic source types.

A sixth aspect can include the method of any one of the first to fifth aspects, wherein a plurality of source gathers each have seismic data representative of a different frequency range.

A seventh aspect can include the method of any one of the first to sixth aspects, further comprising: performing a full waveform inversion analysis on at least one of the source gathers.

An eighth aspect can include the method of any one of the first to seventh aspects, wherein each of the at least two interfering seismic source excitations are separated in time by a random period of time.

A ninth aspect can include the method of any one of the first to eighth aspects, wherein at least two seismic sources types are different and comprise a combination of at least two of: vibrational sources, air gun sources, sparker sources, and low-frequency sources.

A tenth aspect can include the method of any one of the first to ninth aspects, wherein at least one seismic source of the at least two interfering seismic source excitations has altered a sign or phase of its seismic source excitation.

In an eleventh aspect, a method of seismic exploration comprises: initiating a plurality of seismic source excitations above a region of the subsurface containing structural or stratigraphic features conducive to the presence, migration, or accumulation of hydrocarbons, wherein the plurality of seismic source excitations are produced by one or more seismic source types. The seismic source types can have different signatures or frequency characteristics; and producing a blended seismic source survey comprising data obtained from reflections generated by the plurality of seismic source excitations, wherein the blended source seismic survey contains at least two interfering seismic source excitations therein, wherein the at least two interfering seismic source excitations are separated using inversion separation, and wherein one or more source gathers are produced based on the separation of the at least two interfering seismic source excitations.

A twelfth aspect can include the method of the eleventh aspect, wherein the at least two interfering seismic source excitations are separated using inversion separation by solving an equation having the form:

$$d = \Gamma_1 m_1 + \Gamma_i m_i + \ldots + \Gamma_n m_n,$$

for the matrices $m_1, m_i \ldots m_n$, to produce the one or more source gathers, wherein n can be greater than or equal to 1, wherein $m_1$ can be a first source gather of the one or more source gathers, $m_i$ can be another source gather of the one or more source gathers; d is a matrix representation of the recorded seismic data, $\Gamma_1$ is a matrix that defines excitation times of a first source type of one or more seismic source types, and $\Gamma_2$ is a matrix that defines excitation times of another source type of the one or more seismic source types.

A thirteenth aspect can include the method of the eleventh or twelfth aspect, wherein a plurality of source gathers each have seismic data representative of a different frequency range.

A fourteenth aspect can include the method of any one of the eleventh to thirteenth aspects, wherein each of the at least two interfering seismic source excitations are separated in time by a random period of time.

In a fifteenth aspect, a method of seismic exploration above a region of the subsurface containing structural or stratigraphic features conducive to the presence, migration, or accumulation of hydrocarbons, the method comprising: accessing at least a portion of a blended seismic source survey, wherein the blended source seismic survey contains at least two interfering seismic source excitations therein, wherein the seismic source excitations are produced by one or more seismic source types. The seismic source types can have different signatures or frequency characteristics; wherein at least one of the seismic source types is a low-frequency source; separating the at least two interfering seismic source excitations using inversion separation; producing one or more source gathers based on the separating, wherein at least one of the source gathers contains low-frequency data or some missing frequencies; and using the one or more source gathers to explore for hydrocarbons within said region of the subsurface.

A sixteenth aspect can include the method of the fifteenth aspect, wherein separating the at least two interfering seismic source excitations comprises: selecting a first coherency constraint for a first seismic source type of at least two seismic source types; selecting a second coherency constraint for a second seismic source type of the least two seismic source types; and applying the first coherency constraint and the second coherency constraint in the inversion separation to the portion of the blended seismic source survey, wherein producing the one or more source gathers is based on applying the first coherency constrain and the second coherency constraint.

A seventeenth aspect can include the method of the fifteenth or sixteenth aspect, wherein separating the at least two interfering seismic source excitations using inversion separation comprises solving an equation having the form:

$$d = \Gamma_1 m_1 \Gamma_i m_i + \ldots + \Gamma_n m_n,$$

for the matrices $m_1, m_i \ldots m_n$, to produce the one or more source gathers, wherein n can be greater than or equal to 1, wherein $m_1$ is a first source gather of one or more source gathers, $m_i$ is another source gather of the one or more source gathers: d is a matrix representation of the recorded seismic data, $\Gamma_1$ is a matrix that defines excitation times of a first source type of one or more seismic source types, and $\Gamma_i$ is a matrix that defines excitation times of another source type of the one or more seismic source types.

In an eighteenth aspect, a method of seismic exploration above a region of the subsurface containing structural or stratigraphic features conducive to the presence, migration, or accumulation of hydrocarbons comprises: accessing at least a portion of a blended seismic source survey, wherein the blended source seismic survey contains at least two interfering seismic source excitations therein, wherein the seismic source excitations are produced by one or more seismic source types. The seismic source types can have different signatures or frequency characteristics; and using one or more generated source gathers to explore for hydrocarbons within said region of the subsurface.

A nineteenth aspect can include the method of the eighteenth aspect, wherein using the plurality of generated source gathers comprises solving an equation having the form:

$$d = \Gamma_1 m_1 + \Gamma_i m_i + \ldots + \Gamma_n m_n,$$

for the matrices $m_1$, $m_i$ . . . $m_n$, to produce one or more source gathers, wherein n can be greater than or equal to 1, wherein $m_1$ is a first source gather of the one or more source gathers, $m_i$ is another source gather of the one or more source gathers; d is a matrix representation of the recorded seismic data, $\Gamma_1$ is a matrix that defines excitation times of a first source type of one or more seismic source types, and $\Gamma_i$ is a matrix that defines excitation times of another source type of the one or more seismic source types.

A twentieth aspect can include the method of the eighteenth or nineteenth aspect, wherein at least one seismic source of the at least two interfering seismic source excitations has altered a sign or phase of its seismic source excitation.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Numerous other modifications, equivalents, and alternatives, will become apparent to those skilled in the art once the above disclosure is fully appreciated. It is intended that the following claims be interpreted to embrace such modifications, equivalents, and alternatives where applicable. Accordingly, the scope of protection is not limited by the description set out above but is only limited by the claims which follow, that scope including equivalents of the subject matter of the claims.

What is claimed is:

1. A method of seismic exploration above a region of the subsurface containing structural or stratigraphic features conducive to the presence, migration, or accumulation of hydrocarbons, the method comprising:
   accessing at least a portion of a blended seismic source survey, wherein the blended source seismic survey contains at least two interfering seismic source excitations therein, wherein the seismic source excitations are produced by at least two seismic sources having different signatures and different frequency characteristics;
   separating the at least two interfering seismic source excitations using inversion separation based on the different signatures and the different frequency characteristics of the at least two seismic sources;
   producing a plurality of separate source gathers based on the separating; and
   using the plurality of separate source gathers to explore for hydrocarbons within said region of the subsurface.

2. The method of claim 1, wherein separating the at least two interfering seismic source excitations comprises:
   selecting a first coherency constraint for a first seismic source of the at least two seismic sources;
   selecting a second coherency constraint for a second seismic source of the least two seismic sources; and
   applying the first coherency constraint and the second coherency constraint in the inversion separation to the portion of the blended seismic source survey, wherein producing the plurality of source gathers is based on applying the first coherency constrain and the second coherency constraint.

3. The method of claim 2, wherein the first coherency constraint and the second coherency constraint are different.

4. The method of claim 1, wherein separating the at least two interfering seismic source excitations comprises:
   determining activation times for each interfering seismic source excitation of the at least two interfering source excitations; and
   using the activations times corresponding to each seismic source excitation to shift the at least two interfering seismic source excitations to a zero time, wherein producing the plurality of source gathers is based on shifting the at least two interfering seismic source excitations to the zero time.

5. The method of claim 1, wherein separating the at least two interfering seismic source excitations using inversion separation comprises solving an equation having the form:

$$d = \Gamma_1 m_1 + \Gamma_2 m_2,$$

for the matrices $m_1$ and $m_2$ to produce the plurality of source gathers, wherein
$m_1$ is a first source gather of the plurality of source gathers, $m_2$ is a second source gather of the plurality of source gathers;

d is a matrix representation of the recorded seismic data, $\Gamma_1$ is a matrix that defines excitation times of a first source of the at least two seismic sources, and $\Gamma_2$ is a matrix that defines excitation times of a second source of the at least two seismic sources.

6. The method of claim 1, wherein the plurality of source gathers each have seismic data representative of a different frequency range.

7. The method of claim 1, further comprising:
performing a full waveform inversion analysis on at least one of the plurality of source gathers.

8. The method of claim 1, wherein each of the at least two interfering seismic source excitations are separated in time by a random period of time.

9. The method of claim 1, wherein the at least two seismic sources are different and comprise a combination of at least two of: vibrational sources, air gun sources, sparker sources, and low-frequency sources.

10. The method of claim 1, wherein at least one seismic source of the at least two interfering seismic source excitations has altered a sign or phase of its seismic source excitation.

11. A method of seismic exploration comprising:
initiating a plurality of seismic source excitations above a region of the subsurface containing structural or stratigraphic features conducive to the presence, migration, or accumulation of hydrocarbons, wherein the plurality of seismic source excitations are produced by at least two seismic sources having different signatures and different frequency characteristics; and producing a blended seismic source survey comprising data obtained from reflections generated by the plurality of seismic source excitations, wherein the blended source seismic survey contains at least two interfering seismic source excitations therein, wherein the at least two interfering seismic source excitations are separated using inversion separation based on the different signatures and the different frequency characteristics of the at least two seismic sources, and wherein a plurality of source gathers are produced based on the separation of the at least two interfering seismic source excitations.

12. The method of claim 11, wherein the at least two interfering seismic source excitations are separated using inversion separation by solving an equation having the form:

$$d=\Gamma_1 m_1+\Gamma_2 m_2,$$

for the matrices $m_1$ and $m_2$ to produce the plurality of source gathers, wherein $m_1$ is a first source gather of the plurality of source gathers, $m_2$ is a second source gather of the plurality of source gathers;

d is a matrix representation of the recorded seismic data, $\Gamma_1$ is a matrix that defines excitation times of a first source of the at least two seismic sources, and $\Gamma_2$ is a matrix that defines excitation times of a second source of the at least two seismic sources.

13. The method of claim 11, wherein the plurality of source gathers each have seismic data representative of a different frequency range.

14. The method of claim 11, wherein each of the at least two interfering seismic source excitations are separated in time by a random period of time.

15. A method of seismic exploration above a region of the subsurface containing structural or stratigraphic features conducive to the presence, migration, or accumulation of hydrocarbons, the method comprising:
accessing at least a portion of a blended seismic source survey, wherein the blended source seismic survey contains at least two interfering seismic source excitations therein, wherein the seismic source excitations are produced by at least a first seismic source and a second seismic source having different signatures and different frequency characteristics, wherein at least one of the first seismic source or the second seismic source is a low-frequency source;

separating the at least two interfering seismic source excitations using inversion separation based on the different signatures and the different frequency characteristics of at least the first seismic source and the second seismic source;

producing a plurality of separate source gathers based on the separating, wherein at least one of the plurality of separate source gathers contains low-frequency data or some missing frequencies; and using the plurality of separate source gathers to explore for hydrocarbons within said region of the subsurface.

16. The method of claim 15, wherein separating the at least two interfering seismic source excitations comprises:
selecting a first coherency constraint for a first seismic source of the at least two seismic sources;

selecting a second coherency constraint for a second seismic source of the least two seismic sources; and applying the first coherency constraint and the second coherency constraint in the inversion separation to the portion of the blended seismic source survey, wherein producing the plurality of source gathers is based on applying the first coherency constrain and the second coherency constraint.

17. The method of claim 15, wherein separating the at least two interfering seismic source excitations using inversion separation comprises solving an equation having the form:

$$d=\Gamma_1 m_1+\Gamma_2 m_2,$$

for the matrices $m_1$ and $m_2$ to produce the plurality of source gathers, wherein $m_1$ is a first source gather of the plurality of source gathers, $m_2$ is a second source gather of the plurality of source gathers;

d is a matrix representation of the recorded seismic data, $\Gamma_1$ is a matrix that defines excitation times of a first source of the at least two seismic sources, and $\Gamma_2$ is a matrix that defines excitation times of a second source of the at least two seismic sources.

18. A method of seismic exploration above a region of the subsurface containing structural or stratigraphic features conducive to the presence, migration, or accumulation of hydrocarbons, the method comprising:
accessing at least a portion of a blended seismic source survey, wherein the blended source seismic survey contains at least two interfering seismic source excitations therein, wherein the seismic source excitations are produced by at least two seismic sources having different signatures and different frequency characteristics;

separating the at least two interfering seismic source excitations using inversion separation based on the different signatures and the different frequency characteristics of the at least two seismic sources;

producing a plurality of separate source gathers based on the separating; and using the plurality of separate source gathers to explore for hydrocarbons within said region of the subsurface.

19. The method of claim 18, wherein using the plurality of generated source gathers comprises solving an equation having the form:

$$d = \Gamma_1 m_1 + \Gamma_2 m_2,$$

for the matrices $m_1$ and $m_2$ to produce the plurality of source gathers, wherein $m_1$ is a first source gather of the plurality of source gathers, $m_2$ is a second source gather of the plurality of source gathers;

d is a matrix representation of the recorded seismic data, $\Gamma_1$ is a matrix that defines excitation times of a first source of the at least two seismic sources, and $\Gamma_2$ is a matrix that defines excitation times of a second source of the at least two seismic sources.

20. The method of claim 18, wherein at least one seismic source of the at least two interfering seismic source excitations has altered a sign or phase of its seismic source excitation.

* * * * *